(12) United States Patent  
Baker et al.

(10) Patent No.: US 6,944,402 B1  
(45) Date of Patent: Sep. 13, 2005

(54) EXTENDED RANGE INFRARED COMMUNICATION (ERIC) FOR AN INFRARED ASSOCIATED (IRDA) COMPLIANT PORTABLE DEVICE

(75) Inventors: James Clark Baker, Crystal Lake, IL (US); Steven Howard Goode, Barrington, IL (US); Henry Ludwig Kazecki, Arlington Heights, IL (US)

(73) Assignee: Tribeam Technologies, Inc., Arlington Heights, IL (US)

( * ) Notice: Subject to any disclaimer, the term of this patent is extended or adjusted under 35 U.S.C. 154(b) by 979 days.

(21) Appl. No.: 09/715,672

(22) Filed: Nov. 18, 2000

(51) Int. Cl.[7] .......................... H04B 10/04; H04B 10/06; H04B 10/10
(52) U.S. Cl. ..................... 398/128; 398/127; 398/118; 398/183
(58) Field of Search .................. 398/183, 202, 398/127, 128, 130, 118; 342/53; 340/870.28, 870.29; 455/151.2; 725/123

(56) References Cited

U.S. PATENT DOCUMENTS

| | | |
|---|---|---|
| 5,247,380 A | 9/1993 | Lee et al. |
| 5,440,559 A | 8/1995 | Gaskill |
| 5,553,314 A | 9/1996 | Grube et al. |
| 5,677,909 A | 10/1997 | Heide |
| 5,754,961 A | 5/1998 | Serizawa et al. |
| 5,781,177 A | 7/1998 | Helot et al. |
| 5,864,708 A | 1/1999 | Croft et al. |
| 6,047,047 A | 4/2000 | Aldridge et al. |
| 6,047,177 A | 4/2000 | Wickman |
| 6,055,585 A | 4/2000 | Wu et al. |
| 6,061,155 A * | 5/2000 | Meyer ......................... 398/119 |
| 6,064,502 A | 5/2000 | Burns et al. |
| 6,088,730 A | 7/2000 | Kato et al. |
| 6,104,334 A | 8/2000 | Allport |
| 6,714,990 B1 * | 3/2004 | Autio et al. ................. 709/250 |

* cited by examiner

Primary Examiner—M. R. Sedighian
Assistant Examiner—Nathan Curs
(74) Attorney, Agent, or Firm—Cherskov & Flaynik

(57) ABSTRACT

An Infrared Data Association (IrDA) communication range (109) (e.g., 1 meter) of an IrDA compliant portable device (201) is increased to an extended range infrared communication (ERIC) range (209) (e.g., 2 to 40 meters) by extending a transmission range over an uplink channel (207) from the portable device (201) up to a base station (202) and by extending a transmission range over the downlink channel (208) from the base station (202) down to the portable device (201).

18 Claims, 18 Drawing Sheets

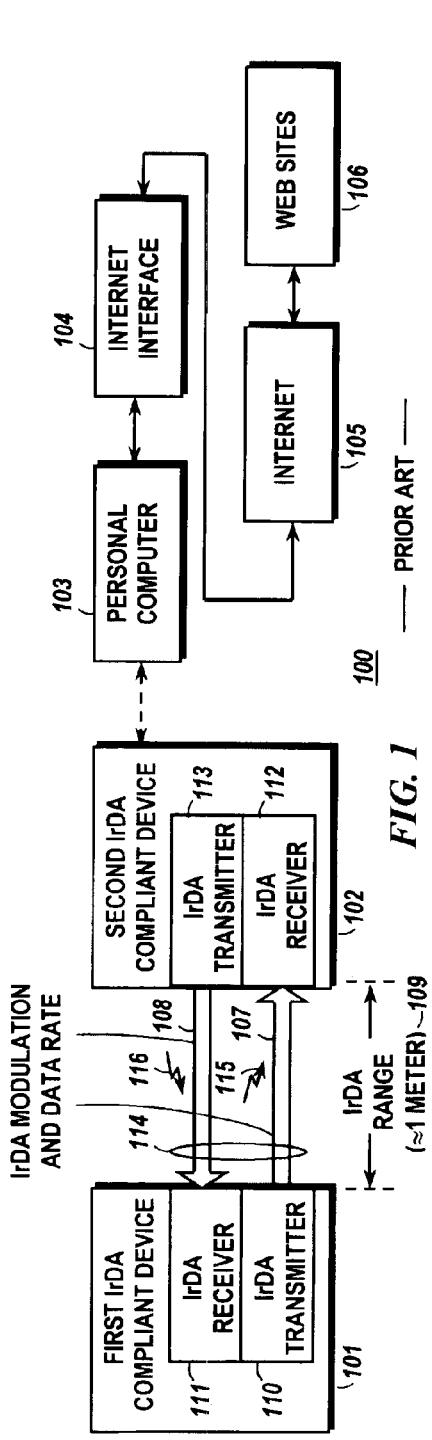
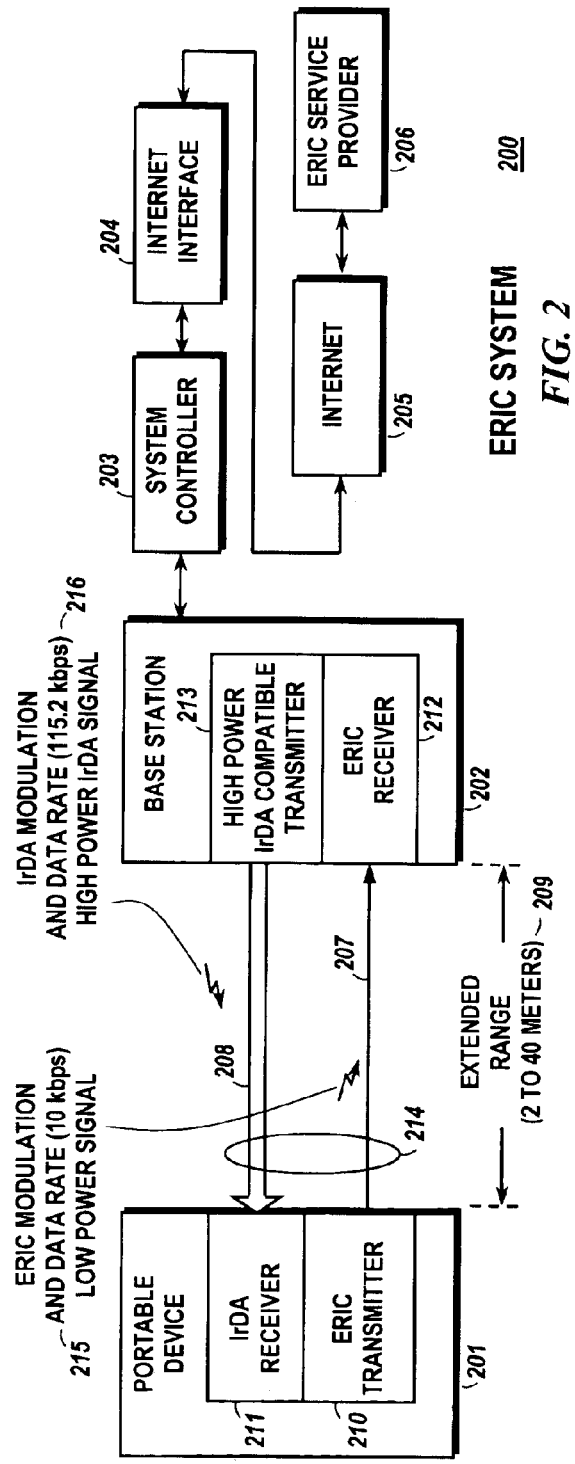
FIG. 1 — PRIOR ART —
FIG. 2 ERIC SYSTEM

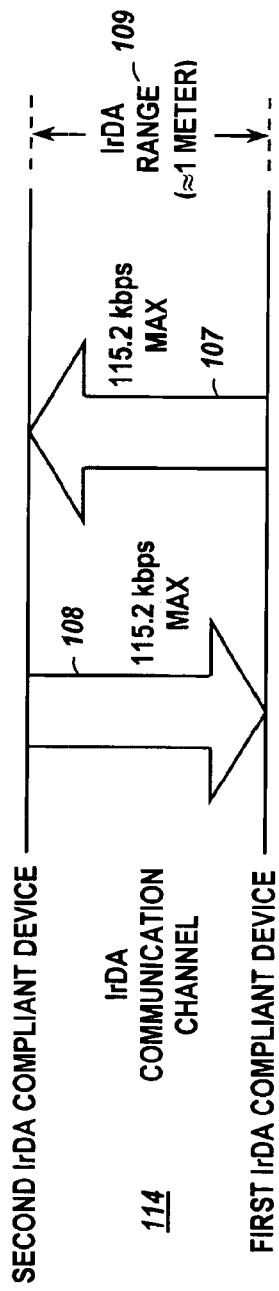
FIG. 3 — PRIOR ART —
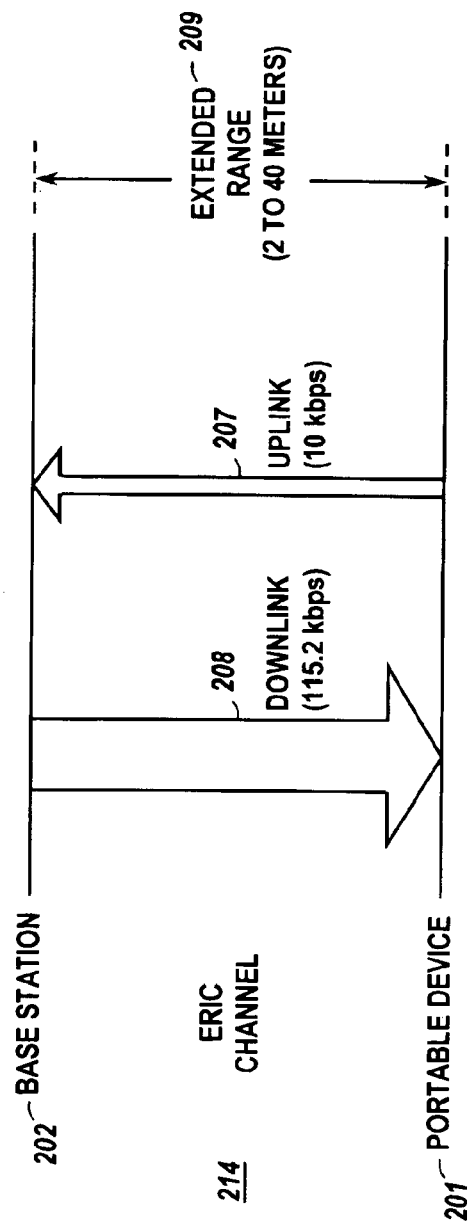
FIG. 4

| EXAMPLES | COVERAGE AREA | PORTABLE DEVICE *201* | BASE STATION *202* | SYSTEM CONTROLLER *203* | INTERNET INTERFACE *204* |
|---|---|---|---|---|---|
| PRIVATE INDIVIDUAL (HOME/OFFICE) | INDIVIDUAL | 1+ | 1 | 1 | 1 |
| SMALL PRIVATE GROUP (CONFERENCE ROOM) | SMALL (UN-NETWORKED) | 1+ | 1 | 0 | 0 |
|  | SMALL (NETWORKED) | 1+ (FEW) | 1+ (FEW) | 1+ (FEW) | 1+ |
| SMALL PUBLIC GROUP (AIRPORT/HOTEL/ENTERPRISE) | MEDIUM | 1+ (SEVERAL) | 1+ (SEVERAL) | 1+ (SEVERAL) | 1+ (SEVERAL) |
| LARGE PUBLIC GROUP (STATE/COUNTRY/WORLD) | LARGE | 1+ (MANY) | 1+ (MANY) | 1+ (MANY) | 1+ (MANY) |

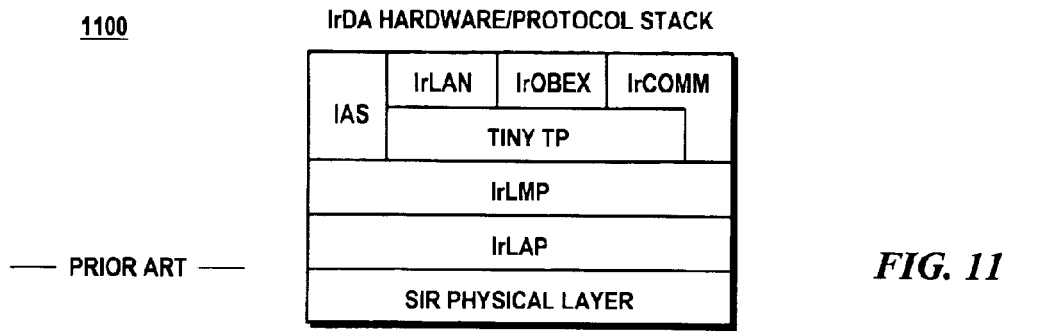
*FIG. 11* — PRIOR ART —
ERIC OPEN SYSTEM INTERCONNECTION (OSI) – REFERENCE MODEL
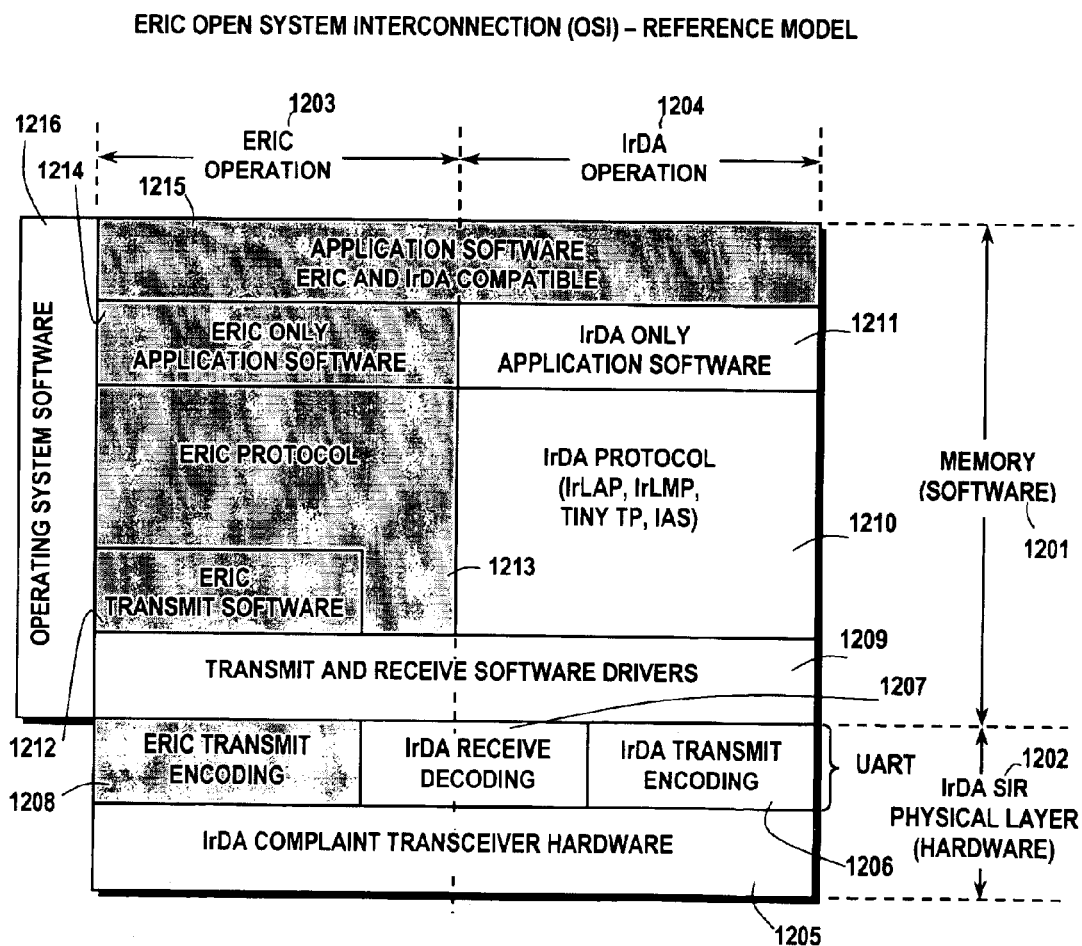
*FIG. 12*

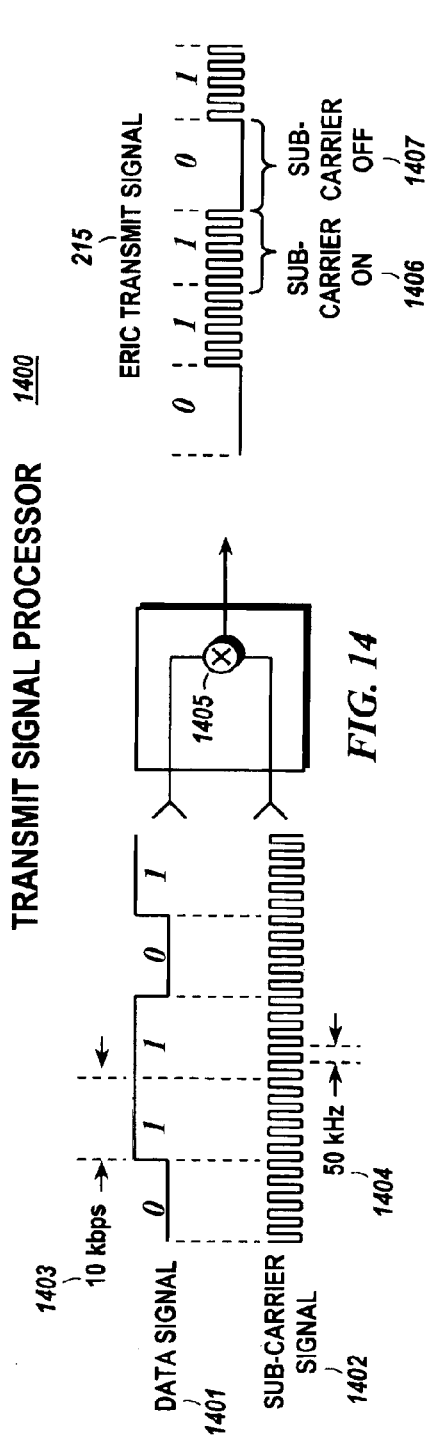
FIG. 14
FIG. 15
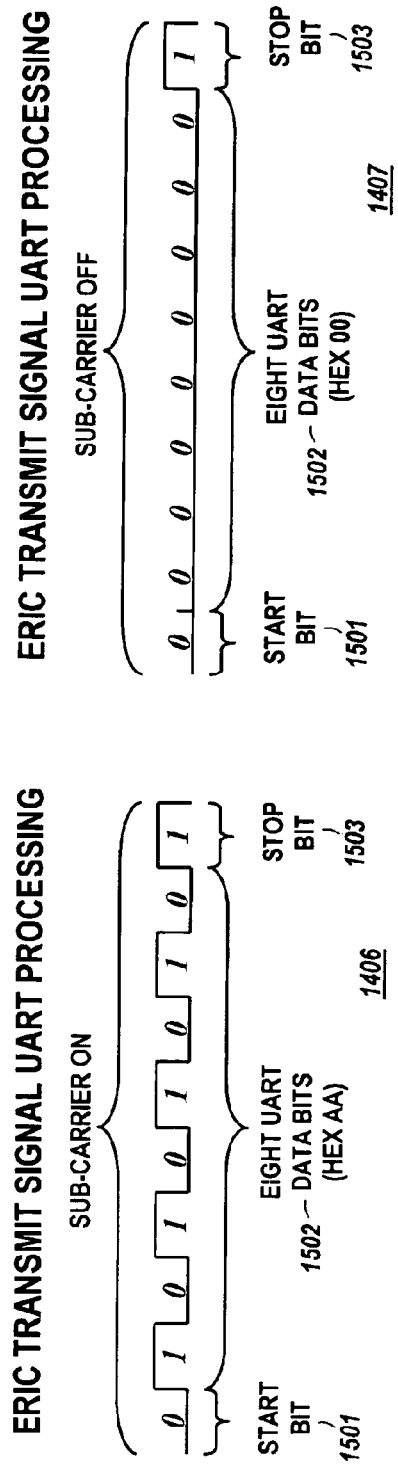
FIG. 16

BASE STATION ERIC RECEIVER CIRCUIT
AND RECEIVE DIODES

*FIG. 22* — PRIOR ART —

FIG. 23  PHYSICAL LAYOUT 2300

EXTENDED RANGE INFRARED COMMUNICATION (ERIC) FOR AN INFRARED ASSOCIATED (IRDA) COMPLIANT PORTABLE DEVICE

FIELD OF THE INVENTION

The present invention relates generally to communications, and more particularly to an extended range infrared communication (ERIC) for an infrared data association (IrDA) compliant portable device.

BACKGROUND OF THE INVENTION

I. Infrared Data Association (IrDA) Communication
A. The Infrared Data Association (IrDA)

IrDA, having headquarters in Walnut Creek, Calif. and having an internet address http://www.irda.org, was established in 1993 as an industry-based non-profit organization to set and support hardware and software standards which create infrared communications links. The Association's charter is to create an interoperable, low-cost, low-power, half-duplex, serial data interconnection standard that supports a walk-up, point-to-point user model that is adaptable to a wide range of applications and devices. IrDA standards support a broad range of computing, communications, and consumer devices. IrDA is committed to developing and promoting infrared standards for the hardware, software, systems, components, peripherals, communications, and consumer markets. According to IrDA, IrDA technology is presently implemented in over 100 million electronic devices including desktop personal computers (PCs), notebook PCs, palm PCs, docking stations, printers, digital cameras, public phones/kiosks, cellular phones, pagers, personal digital assistants (PDAs), electronic books, electronic wallets, and other mobile devices.

B. IrDA Data Specification

IrDA promotes several specifications including, without limitation: IrDA Infrared Wrist Watch (IrWW), IrDA Mobile Communications (IrMC), IrDA very fast infrared (VFIR) having a data rate of 16 Mbps. The IrDA specifications are supported by all divisions of Microsoft® (e.g., IDG, WinCE, WinNT, Win98 and Win2000).

C. Communication System Having IrDA Compliant Devices

FIG. 1 illustrates a block diagram of a communication system 100 including a first IrDA compliant device 101 adapted to communicate with a second IrDA compliant device 102 over an infrared communication channel 114 at an IrDA compliant communication range 109 in accordance with the prior art. The communication system 100 generally includes the first IrDA compliant device 101, the second IrDA compliant device 102, a personal computer 103, an internet interface 104, an internet 105 and web sites 106. The first IrDA compliant device 101 includes an IrDA receiver 111 and an IrDA transmitter 110. The second IrDA compliant device 102 includes an IrDA receiver 112 and an IrDA transmitter 113. The IrDA transmitter 110 in the first IrDA compliant device 101 transmits a signal 115 to the IrDA receiver 112 in the second IrDA compliant device 102 over a first channel 107. The IrDA transmitter 113 in the second IrDA compliant device 102 transmits a signal 116 to the IrDA receiver 111 in the first IrDA compliant device 101 over a second channel 108. The IrDA compliant communication range 109 is specified to be a minimum distance of one meter.

Each one of the first IrDA compliant device 101 and the second IrDA compliant device 102 is generally well known to be one of the electronic devices listed above under section I.A. For example, an IrDA compliant PDA can communicate with another IrDA compliant PDA over the one meter distance 109 in the conventional "beam mode", without a connection to the personal computer 103. Or, for example, an IrDA compliant PDA can communicate, via the "beam mode" or a hardwire connection, with an IrDA compliant docking station connected to the personal computer 103. PDA's are presently available for under $200.00 USD. In this example, the user of the IrDA compliant PDA can subscribe to a free download service at a web site such as that provided by AvantGo, Inc. (www.avantgo.com) to download information such as news updates, stock updates, and the like to the IrDA compliant PDA for later viewing.

The signal 115 transmitted over the first channel 107 and the signal 116 transmitted over the second channel 108 both have same IrDA signal modulation (i.e., pulse modulation) and the same data rate (e.g., 2.4 to 115.2 kbps).

D. IrDA Communication Channel

FIG. 3 illustrates symmetrical data rates transmitted over a first channel 107 and a second channel 108 IrDA compliant communication channel between the first IrDA compliant device 101 and the second IrDA compliant device 102, each shown in FIG. 1, in accordance with the prior art. The signal 115 transmitted over the first channel 107 and the signal 116 transmitted over the second channel 108 both have same IrDA signal modulation (i.e., pulse modulation with a 3/16 bit time) and the same data rate (e.g., 2.4 to 115.2 kbps).

A first wideband path represents the first channel 107 and a second wideband path represents the second channel 108 to graphically indicate that the capacity for information transmission on the first channel 107 and the second channel 108 are the same. Hence, the first channel 207 and the second channel 208 are referred to as symmetrical, as opposed to asymmetrical, because the capacity for information transmission is the same for each channel.

E. IrDA Data Hardware/Protocol Stack

FIG. 11 illustrates an IrDA data hardware/protocol stack used by the first IrDA compliant device and the second IrDA compliant device, each shown in FIG. 1, in accordance with the prior art. A detailed description of the IrDA data hardware/protocol stacks may be found at http://www.irda.org/use/pubs/Overview.PDF in a publication entitled "IrDA Infrared Communications: An Overview" prepared by Patrick J. Megowan, David W. Suvak, Charles D. Knutson, of Counterpoint Systems Foundary, Inc. (www.countersys.com) herein incorporated by reference.

IrDA data protocols consist of a mandatory set of protocols and a set of optional protocols. The mandatory protocols include: PHY (Physical Signaling Layer), IrLAP (Link Access Protocol) and IrLMP (Link Management Protocol and Information Access Service (IAS). Characteristics of PHY include: range, bi-directional communication, data transmission rate, IrDA encoding/decoding, and cyclic redundancy check (CRC). The range provides continuous operation from contact to at least 1 meter (typically 2 meters can be reached). A low power version relaxes the range objective for operation from contact through at least 20 cm between low power devices and 30 cm between low power and standard power devices. This implementation affords 10 times less power consumption. These parameters are termed the required maximum ranges by certain classes of IrDA featured devices and sets the end user expectation for discovery, recognition and performance. Bi-directional communication is the basis of all specifications. IrDA data transmission rates are presently available or under development from 2400 bps up to maximum up to 16 Mbps.

Presently, many IrDA compliant devices operate at a maximum data rate of 115.2 kbps. Data packets are protected using a CRC (CRC-16 for speeds up to 1.152 Mb/s and CRC-32 at 4 Mb/s). Characteristics of IrLAP includes handling: device-to-device connection for the reliable, ordered transfer of data, device discover procedures, and hidden nodes. Characteristics of IrLMP include providing: multiplexing of the IrLAP layer (multiple channels above an IrLAP connection), and protocol and service discovery via the Information Access Service (IAS).

Optional IrDA Data Protocols include: Tiny TP, IrCOMM, IrOBEX, IrDA Lite, IrTran-P, IrMC, IrLAN. Tiny TP provides flow control on IrLMP connections with an optional Segmentation and Reassembly service. IRCOMM provides COM (serial and parallel) port emulation for legacy COM applications, printing and modem devices. IrOBEX provides object exchange services similar to HTTP. IrDA Lite provides methods of reducing the size of IrDA code while maintaining compatibility with full implementations. IrTran-P provides image exchange protocol used in Digital Image capture devices/cameras. IrMC specifications on how mobile telephony and communication devices can exchange information including phonebook, calendar, and message data. Also how call control and real-time voice are handled (RTCON) calendar. IrLAN Describes a protocol used to support IR wireless access to local area networks.

II. Radio Frequency Communication

A. Cellular

Cellular telephones are now a widely accepted form of wireless communication. Initially, cellular telephones were primarily used for full duplex voice applications. Presently, with the deployment of digital cellular systems and phones data applications are in higher demand. Digital cellular phones use a wireless application protocol (WAP) application as a browser to access and retrieve data on the internet. Third generation cellular telephone technology, otherwise known as 3G cellular, is currently being deployed to meet the demand for wireless data applications. The 3G cellular technology currently provides a rate of data transfer of about 384 kbps (384,000 bits per second).

B. Bluetooth

Bluetooth, presently having a web site at htt:// www.bluetooth.com, is a codename for an open technology standard specification jointly developed by Ericsson, Intel, IBM, Toshiba, and Nokia. Bluetooth is for small form factor, low-cost, short range radio links (e.g., 10 centimeters to 10 meters) of voice and data communications between mobile devices, such as between a cellular phone and a laptop computer, and between mobile and fixed devices, such as between an electronic camera and a printer. The short range radio links are implemented using compact and cost effective short range radio transceivers operating in the international 2.4 GHz ISM band. Hence, Bluetooth replaces cables and makes automatic, unattended, short range communications between devices possible. However, Bluetooth does not appear to disclose or suggest an application for 911 service, including E911 service for wireless communication devices, such as cellular telephones.

C. Cellular Digital Packet Data (CDPD)

Palm™ VII is a wireless device, employing CDPD signaling, are marketed as a device to query the internet and does not provide an interactive way to get website content over the internet. A user must have a corresponding Palm Query Application (PQA) for the internet site already loaded into the Palm VII before the Palm VII can download information from a particular web site.

Omni Sky™ is a wireless data service for Palm V PDA's. The Palm V requires a large clip-on radio frequency accessory that employs the CDPD signaling.

D. Home RF

The HomeRF Working Group (HRFWG) was formed to provide the foundation for a broad range of interoperable consumer devices by establishing an open industry specification for wireless digital communication between PCs and consumer electronic devices anywhere in and around the home. The HRFWG, which includes the leading companies from the personal computer, consumer electronics, peripherals, communications, software, and semiconductor industries, has developed a specification for wireless communications in the home called the Shared Wireless Access Protocol (SWAP).

To date, the high cost and impracticality of adding new wires have inhibited the wide spread adoption of home networking technologies. Wired technologies also do not allow users to roam about with portable devices. In addition, multiple, incompatible communication standards have limited acceptance of wireless networks in the home. The HRFWG believes that the open SWAP specification will break through these barriers by (1) enabling interoperability between many different consumer electronic devices available from a large number of manufacturers, and (2) provide the flexibility and mobility of a wireless solution. This flexibility is important to the success of creating a compelling and complete home network solution.

E. IEEE 802.11

In IEEE's proposed standard for wireless LANs (IEEE 802.11), there are two different ways to configure a network: ad-hoc and infrastructure. In the ad-hoc network, computers are brought together to form a network "on the fly." There is no structure to the network; there are no fixed points; and usually every node is able to communicate with every other node. A good example of this is a meeting where employees bring laptop computers together to communicate and share design or financial information. Although it seems that order would be difficult to maintain in this type of network, algorithms have been designed to "elect" one machine as the base station (master) of the network with the others being slaves. Another algorithm in ad-hoc network architectures uses a broadcast and flooding method to all other nodes to establish who's who.

The second type of network structure used in wireless local area networks (LANs) is the infrastructure. This architecture uses fixed network access points with which mobile nodes can communicate. These network access points are sometime connected to landlines to widen the LAN's capability by bridging wireless nodes to other wired nodes. If service areas overlap, handoffs can occur. This structure is very similar to the present day cellular networks around the world.

cyberPIXIE, Inc. is currently developing a high speed wireless network that uses the IEEE 802.11b wireless LAN standard. This system enables wireless connectivity to portable devices with speeds of up to 11 Mbps with the use of a simple plug in card. The cyberPIXIE wireless network permits seamless roaming throughout the coverage area, so a person is no longer confined to a business center or room. CyberPIXIE claims that their portable device will cost about $1,500.00 USD.

Frontpath, Inc. is currently developing a product called ProGear™. ProGear is an information appliance that combines your business application with wireless connectivity, touch screen technology, and handwriting recognition into a lightweight, portable device. The ProGear solution is broadband dedicated giving your customers instant access to customized information. Frontpath is cooperating with cyberPIXIE to provide the ProGear portable device for cyberPIXIE's high speed wireless network.

III. Patents

The following patents disclose a variety of wireless communication technology, such as infrared and radio frequency technology, or other communication technology. The complete disclosure of each of the following patents is herein incorporated into the present specification by reference for use in any combination with any information disclosed by the present specification. The patents include: U.S. Pat. No. 5,247,380—Lee et al., issued Sep. 21, 1993, U.S. Pat. No. 5,440,559—Gaskill, issued Aug. 8, 1995 and assigned to Seiko Communications Holding N.V.; U.S. Pat. No. 5,553,314—Grube et al., issued Sep. 3, 1996 and assigned to Motorola, Inc.; U.S. Pat. No. 5,677,909—Heide, issued, Oct. 14, 1997 and assigned to Spectrix Corporation; U.S. Pat. No. 5,781,177—Helot et al., issued Jul. 14, 1998 and assigned to Hewlett-Packard Company; U.S. Pat. No. 5,754,961—Serizawa et al., issued May 19, 1998 and assigned to Kabushiki Kaisha Toshiba; U.S. Pat. No. 5,864,708—Croft et al., issued Jan. 26, 1999; U.S. Pat. No. 6,047,047—Aldridge et al., issued Apr. 4, 2000 and assigned to 3Com Corporation; U.S. Pat. No. 6,047,177—Wickman, issued Apr. 4, 2000 and assigned to Telia AB; U.S. Pat. No. 6,055,585—Wu et al., issued Apr. 25, 2000 and assigned to 3Com Corporation; U.S. Pat. No. 6,061,155—Meyer, issued May 9, 2000 and assigned to Interrnec IP Corporation; U.S. Pat. No. 6,088,730—Kato et al., issued May 16, 2000 and assigned to Enderlin, Inc.; U.S. Pat. No. 6,064,502—Burns et al., issued Jul. 11, 2000 and assigned to International Business Machines Corporation; and U.S. Pat. No. 6,104,334—Allport, issued Aug. 15, 2000 and assigned to eRemote, Inc.

IV. Conclusion

Each of the above-mentioned infrared and radio frequency technologies have their pros and cons, as are well known in the art. The IrDA technology has a much higher capacity of downloading data to an IrDA compliant portable device than that provided by the RF technologies because of the limitations on transmitting at high data rates over an RF signal (e.g. 4 to 16 Mbps for IrDA and 384 kbps for RF). The portable devices employing RF technologies have greater mobility than those portable devices employing IrDA technology because of the line of sight requirement for infrared communications (e.g., kilometers for RF and one meter for IrDA). The IrDA technology has a much lower cost than that provided by the RF technologies because the IrDA signal operates at a low power level and requires relatively simple circuits relative to a RF signal. Hence, there is a need for a low cost portable device that can receive high capacity data while having higher mobility than one meter. Accordingly, there is a need for an extended range infrared communication (ERIC) for an infrared data association (IrDA) compliant portable device.

BRIEF DESCRIPTION OF THE DRAWINGS

FIG. 1 illustrates a block diagram of a communication system including a first IrDA compliant device adapted to communicate with a second IrDA compliant device over an infrared communication channel at an IrDA compliant communication range, in accordance with the prior art.

FIG. 2 illustrates a block diagram of an extended range infrared communication (ERIC) system including a base station adapted to communicate with a portable device over an infrared communication channel at an ERIC range that is greater than the IrDA communication range, shown in FIG. 1, in accordance with a first preferred embodiment of the present invention.

FIG. 3 illustrates symmetrical data rates transmitted over an IrDA compliant communication channel between the first IrDA compliant device and the second IrDA compliant device, each shown in FIG. 1, in accordance with the prior art.

FIG. 4 illustrates an extended range infrared communication (ERIC) channel, having an uplink channel that is asymmetrical with respect to a downlink channel, between the portable device and the base station, each shown in FIG. 2, in accordance with a first preferred embodiment of the present invention.

FIG. 8 illustrates a table describing examples of the plurality of combinations of the communication system, shown in FIG. 7, designed to provide corresponding coverage areas to serve corresponding user environments, in accordance with a first preferred embodiment of the present invention.

FIG. 11 illustrates an IrDA data hardware/protocol stack used by the first IrDA compliant device and the second IrDA compliant device, each shown in FIG. 1, in accordance with the prior art.

FIG. 12 illustrates an extended range infrared communication (ERIC) open system interconnection (OSI)—Reference Model including an ERIC protocol stack used by the portable device, shown in FIG. 9, in accordance with a first preferred embodiment of the present invention.

FIG. 14 illustrates a block diagram of a transmit signal processor that conceptually describes how a data signal is combined with a carrier signal to produce an extended range infrared communication (ERIC) transmit signal, in accordance with a first preferred embodiment of the present invention.

FIG. 15 illustrates data bits applied to the UART, shown in FIGS. 9 and 13, causing the UART to turn on a sub-carrier of the extended range infrared communication (ERIC) transmit signal, shown in FIG. 14, in accordance with a first preferred embodiment of the present invention.

FIG. 16 illustrates data bits applied to the UART, shown in FIGS. 9 and 13, causing the UART to turn off a sub-carrier of the extended range infrared communication (ERIC) transmit signal, shown in FIG. 14, in accordance with a first preferred embodiment of the present invention.

DETAILED DESCRIPTION OF A PREFERRED EMBODIMENT

Figure 5:
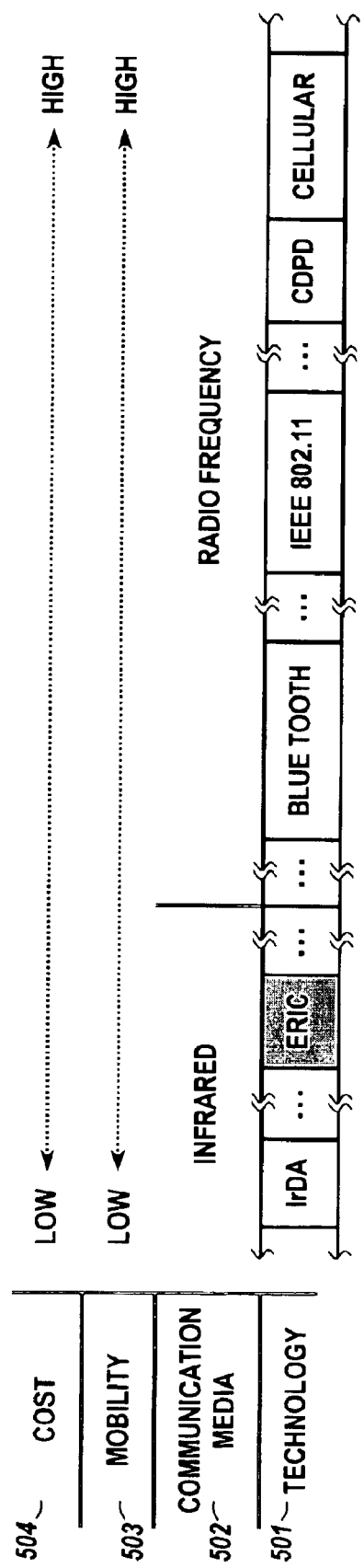
FIG. 5 illustrates a chart describing engineering compromises between infrared (IR) technology and radio frequency (RF) technology relative to the extended range infrared communication (ERIC) technology, in accordance with a first preferred embodiment of the present invention.

I. Extended Range Infrared Communication (ERIC)
A. Overview
1. Scenario

Can you imagine yourself sitting in your seat at a gate in an airport terminal waiting for your plane to board? The plane has been delayed and you have a two hour wait in addition to the one hour you have already waited before the scheduled flight time. You are tired, bored and frustrated with the delay. Then you notice the person next to you busy, interested and excited while using their personal digital assistant (i.e. PDA), for example, a Palm™ PDA. You think that it is unusual that they are that happy to be reviewing their calendar, schedule, or reading preloaded information such as old news clips or stale stock quotes so you ask them what they are so happy about. They tell you that they have been busy surfing the internet to plan their next vacation, reading their email, watching a movie, paying their bills, checking on the security of their house, all while keeping tabs on the updated flight delays. Your are shocked by this response and respond by asking them how it is possible that they can do all of that with a PDA from their seat at the airport gate. They tell you that they have extended range infrared communication (ERIC) technology. They explain to you that by loading ERIC software into their PDA and by accessing the ERIC system, via a local base station, over an infrared channel, they can do all of these wonderful things. They also add that they can't do all of these great things with their third generation cellular telephone or their Palm VII PDA because those radio frequency technologies don't provide a high capacity of information download like their PDA's infrared technology. Then you notice that the person is pointing their PDA in the general direction of base station, having a relatively small semispherical housing, mounted flush against the ceiling ten meters above the seats at the gate. Confused you ask how their PDA can communicate with a base station ten meters away over an infrared communication channel when your PDA can only communicate with a docking station only one meter away over a conventional IrDA communication channel. They respond by explaining the beauty of the ERIC technology; the ERIC software in the PDA in combination with the base station provides a range extension of about 40 meters greater than the range provided by the conventional IrDA communication channel. Now you are so excited about the prospect of getting the ERIC software so that you can also do all these great things on your PDA. To your surprise the other person ask you if you would like to get on the ERIC system immediately. You anxiously ask how you can do this. The person simply asks you to take out your PDA and set it to the conventional IrDA beam mode. Then they beam over a copy of the ERIC software from their PDA to your PDA. The next thing you do is launch an ERIC registration application associate with the ERIC software in your PDA that connects you to an ERIC service provider over the internet, via the base station, where you register as a subscriber, set up an account, etc. Now you are live on the internet to perform interactive surfing! Oops, time to board my plane! I got so much done; the time sure went by quickly!

2. Technical Overview

In a first preferred embodiment of the present invention, an Infrared Data Association (IrDA) communication range 109 (e.g., 1 meter) of an IrDA compliant portable device 201 is increased to an extended range infrared communication (ERIC) range 209 (e.g., 2 to 40 meters) by extending a transmission range over a uplink channel 207 from the portable device 201 up to a base station 202 and by extending a transmission range over the downlink channel 208 from the base station 202 down to the portable device 201. The extension of the transmission range over the uplink channel 207 is accomplished in part by modifying the IrDA compliant portable device 201 by adding ERIC software 911, including a software switch 913, to the IrDA compliant portable device 201, while reusing the same hardware 901, 902, 903, 904, 905, 906, 907 and 908 in the IrDA compliant portable device 201. The ERIC software 911 narrows a bandwidth of an infrared (IR) transmit signal 215 over the uplink channel 207 from an IrDA compliant bandwidth (e.g., at least 115.2 KHz) to an ERIC bandwidth (e.g., 20 KHz). The ERIC bandwidth is created by lowering the data rate of the IR transmit signal 215 from an IrDA data rate (e.g., 115.2 kbps) to an ERIC data rate (e.g., 10 kbps), and by changing the signal modulation method for transmitting the IR transmit signal 215 from an IrDA signal modulation method (e.g. pulse modulation) to an ERIC signal modulation method (e.g., amplitude modulation). The extension of the transmission range over the uplink channel 207 is accomplished further in part by using a receiver 212 in the base station 202 designed to receive the IR transmit signal 215, having the ERIC data rate and the ERIC modulation method, over the uplink channel 207. The receiver 212 maximizes its sensitivity by detecting the IR transmit signal 215 with a sensitive photodiode detector 1905 and by receiving the IR transmit signal with a narrowband ERIC receiver circuit 1906. The IR communication range of an IR transmit signal 216 is extended over the downlink channel 208 by the base station 202 transmitting the IR transmit signal 216, having the IrDA data rate (e.g., 115.2 kbps) and the IrDA signal modulation method (e.g. pulse modulation), over the downlink channel 208 at a higher power level than an IrDA power level required to meet the IrDA communication range 109 (e.g., 1 meter).

In the first preferred embodiment of the present invention, the portable device 201 is designed to operate in either an IrDA communication mode, to communicate over the IrDA range 109, or an ERIC communication mode, to communicate over the ERIC range 209, and the base station 202 is designed to operate in only the ERIC communication mode. Alternatively, the base station 202 may be designed to operate in either the IrDA communication mode or the ERIC communication mode. Alternatively, portable device 201 may be designed to operate in only the ERIC communication mode and not in the IrDA communication mode.

B. Communication System

FIG. 2 illustrates a block diagram of an ERIC system 200 including a base station 202 adapted to communicate with a portable device 201 over an infrared communication channel 214 at an ERIC range 209 that is greater than the IrDA communication range 109, shown in FIG. 1, in accordance with the first preferred embodiment of the present invention. The base station 202 and the portable device 201 are generally known as communication devices.

The ERIC system 200 generally includes the portable device 201, the base station 202, the system controller 203, the internet interface 204, the internet 205 and the ERIC system provider 206. The portable device 201 generally includes an ERIC transmitter 210 and an IrDA compliant receiver 211. The base station 202 generally includes an ERIC receiver 212 and a high power IrDA compatible transmitter 213.

The portable device 201 communicates with the base station 202 over the infrared communication channel 214. The infrared communication channel 214 includes an uplink channel 207 and a downlink channel 208. The uplink channel 207 transmits a signal 215 from the ERIC transmitter 210 in the portable device 201 to the ERIC receiver 212 in the base station 202, as indicated by the direction of the arrow on the uplink channel 207. The downlink channel 208 transmits a signal 216 from the high power IrDA compatible transmitter 213 in the base station 202 to the IrDA receiver 211 in the portable device 201, as indicated by the direction of the arrow on the downlink channel 208. FIG. 4 provides a more detailed description of the infrared communication channel 214.

The signal 215 communicated on the uplink channel 207 uses an ERIC signal modulation method, an ERIC data rate and an IrDA compliant power level. The signal 216 communicated on the downlink channel 208 uses an IrDA compliant signal modulation method, an IrDA compliant data rate, and a power level that is higher than an IrDA power level required to meet the IrDA communication range.

The ERIC range 209 represents a distance between the portable device 201 and the base station 202 over which the portable device 201 may communicate with the base station 202. The ERIC range 209 is preferably two to forty meters.

The portable device 201 may be implemented as or integrated within, without limitation, desktop personal computers (PCs), notebook PCs, palm PCs, pocket PC's, docking stations, printers, facsimile machines, digital cameras, public phones, kiosks, portable phones such as cellular phones and cordless phones, pagers, personal digital assistants (PDAs), electronic books, electronic wallets, watches, smart cards, internet appliances, two-way radios and other mobile or portable devices. In the first preferred embodiment of the present invention, the portable device 201 is a personal digital assistant (PDA) such as: Palm, Inc.'s line of PDAs, Handspring, Inc.'s line of PDAs, Hewlett Packard's Jornada™ PDA, and the like.

Preferably, the portable device 201 is small enough to be hand carried and are moveable. However, although the term "portable" is used to describe the device, the device is not limited to only devices that are small enough to be hand carried or that are moveable. For example, some applications may require that the portable device be mounted in a fixed position or integrated into a large object that cannot easily be moved.

The base station 202 communicates with the system controller 203. The system controller 203 communicates with the internet interface 204. The internet interface 204 communicates with the internet 205. The internet 205 communicates with the ERIC system provider 206. The ERIC system provider 206 provides services, to a user or subscriber of the portable device 201, that are similar to that of an internet service provider, such as registration, private accounts, and the like.

C. Extended Range Infrared Communication (ERIC) Channel

FIG. 4 illustrates an extended range infrared communication (ERIC) channel, having an uplink channel 207 that is asymmetrical with respect to a downlink channel 208, between the portable device 201 and the base station 202, each shown in FIG. 2, in accordance with the first preferred embodiment of the present invention.

A narrowband path represents the uplink channel 207 and a wideband path represents the downlink channel 208 to graphically distinguish a capacity for information transmission on the uplink channel 207 and the downlink channel 208. The downlink channel 208, as represented by the wideband path, has a greater capacity for information transmission than the uplink channel 207, as represented by the narrowband path. Consequently, the downlink channel 208 can transmit more information than the uplink channel 207. Hence, the uplink channel 207 and the downlink channel 208 are referred to as asymmetrical, as opposed to symmetrical, because the capacity for information transmission is different for each channel.

The capacity for information transmission over a communication channel is represented by a rate of data transmission over a communication channel and is otherwise referred to as a data rate of a communication signal. A higher data rate for a communication signal has a greater capacity for information transmission over a communication channel. A lower data rate for a communication signal has a lower capacity for information transmission over a communication channel. Likewise, the capacity for information transmission over a communication channel is related to a speed or a response time for the information transmission over a communication channel. A higher capacity for information transmission, as represented by a higher data rate, has a higher speed or response time for the information transmission. A lower capacity for information transmission, as represented by a lower data rate, has a lower speed or response time for the information transmission. The particular data rates used for the uplink channel 207 and the downlink channel 208 may be any desired data rate. In the first preferred embodiment of the present invention, the uplink channel 207 has a capacity for information transmission represented by a data rate of 10 kbps (i.e., 10,000 bits per second) and the downlink channel 208 has a capacity for information transmission represented by a data rate of 115.2 kbps (i.e., 115,200 bits per second). Hence, in the first preferred embodiment of the present invention, the downlink channel 208 has a capacity for information transmission over ten times greater than the capacity for information transmission over the uplink channel 207. In IrDA compliant devices employing other IrDA specifications having a data rate of 4.0 Mbps (i.e., 4,000,000 bits per second) or 16 Mbps (i.e., 16,000,000 bits per second), the downlink channel 208 in the ERIC system would have a capacity for information transmission over 400,000 times greater or 1,600,000 times greater, respectively, than the capacity for information transmission over the uplink channel 207.

In the first preferred embodiment of the present invention, the uplink channel 207 being asymmetrical or different, than the downlink channel 208 does not restrict or slow down communication between the portable device 201 and the base station 202 because of the types of information that are anticipated for communication between the portable device 201 and the base station 202. The uplink channel 207 preferably transmits low capacity information, such as control or command information. A user manually generates control or command information by operating a keypad, a touch screen, a voice recognition circuit, a cursor, and the like. Further, a portable device automatically generates control or command information when requesting files, file updates, and the like. The downlink channel 208 preferably carries high capacity information, such as an electronic file, an electronic image, and the like.

Further, in the first preferred embodiment of the present invention, the uplink channel 207 being asymmetrical or different, than the downlink channel 208 contributes to creating the ERIC range 209 between the portable device 201 and the base station 202. The following figures and description provides a detailed description of how the asymmetrical channels creating the ERIC range 209 between the portable device 201 and the base station 202.

D. Infrared Technology Versus Radio Frequency Technology

FIG. 5 illustrates a chart 500 describing engineering compromises between infrared (IR) technology and radio frequency (RF) technology relative to the extended range infrared communication (ERIC) technology, in accordance with a first preferred embodiment of the present invention. The chart 500 generally describes various wireless communication technologies 501, two wireless communication media 502, a mobility scale 503 and a cost scale 504. Particular values for the mobility scale and the cost scale are not important to describe the chart 500.

The two wireless communication media include IR and RF communication media. The various wireless communication technologies are associated with either the IR communication media or the RF communication media. The IR technologies described include IrDA technology and ERIC technology. The RF technologies described include Bluetooth™, IEEE 802.11 specification, cellular digital packet data (CDPD), and cellular technologies. The three dots and break lines between the described technologies indicate that other technologies do exist or can exist between the described technologies. Generally, each of the RF technologies and the IrDA technology described are well know to those skilled in the art of communications. The ERIC technology is the subject of the first preferred embodiment of the present invention.

The mobility scale and the cost scale are each represented as a continuous scale ranging from low to high. Mobility generally describes the size of a coverage area over which a portable device, employing one of the various technologies, can communicate with a system, employing a corresponding one of the various technologies.

Generally, devices employing IR technologies have less mobility than devices employing RF technologies. One reason for this is that devices transmit an IR signal at a lower power than devices transmitting a RF signal. Another reason for this is that an IR signal requires line of sight communication because the IR signal is carried on a beam of light having a frequency in the infrared portion of the frequency spectrum. Line of sight generally means that two devices communicating over an IR signal are generally pointed at one another without any significant obstruction, such as a solid wall, or other large object, between the two devices. However, the two devices do not have to be pointed exactly at one another because the beam of light may reflect off of some nearby objects and because light emitting diodes used to generate the beam of light and photodector diodes used to receive the beam of light typically have a conical or cone shaped coverage area with a vertex angle of about thirty degrees, for example. Hence, the mobility of devices employing IR technologies is generally limited to line of sight communication at a relatively low power level.

Generally, devices employing RF technologies have more mobility than devices employing IR technologies. One reason for this is that devices transmit a RF signal at a higher power than devices transmitting an IR signal. Another reason for this is that a RF signal can be transmitted through most solid, nonmetallic objects because the RF signal is carried on a carrier signal having a frequency in the radio frequency portion of the frequency spectrum. The particular frequency of the RF signal also affects the mobility of a device employing RF technologies. Hence, devices employing RF technologies generally have a higher degree of mobility than devices employing IR technology.

Cost generally describes the amount of money needed to build, operate and/or maintain a portable device and/or system equipment, employing one of the various technologies. Generally, the cost of a portable device and/or system equipment, employing an IR technology is less than the cost of a portable device and/or system equipment, employing a RF technology. One reason for this is that IR technology is less complex than RF technology.

Starting at the left hand side of the chart 500, the IrDA technology is the first described IR technology. The IrDA technology is described as having the lowest mobility and cost relative to the ERIC technology and all of the RF technologies. For example, the mobility of a system employing IrDA data technology typically has a range of about one meter. Further, the cost of a system employing IrDA data technology is very low due to the relative simplicity of an IrDA data signal. The lrDA data signal requires relatively inexpensive and widely available circuits such as a universal asynchronous receiver transmitter (UART) and an IrDA compliant transmitter/receiver (transceiver).

Moving across the technology bar to the right, the ERIC technology is the next described IR technology. The ERIC technology has a higher mobility and cost relative to the IrDA technology, but a lower mobility and cost relative to all of the RF technologies. In the first preferred embodiment of the present invention, the mobility of a system employing ERIC technology typically has a range of about two meters to forty meters. Further, the cost of a portable device employing ERIC data technology is about the same as a portable device employing IrDA data technology because the ERIC technology reuses the same hardware circuitry, such as the UART and the IrDA compliant transceiver employed in the IrDA data technology and adds only new ERIC software to the IrDA data technology. The cost of system equipment employing the ERIC technology is marginally higher than that of system equipment employing the IrDA data technology. Hence, the ERIC technology has a significant net increase in range or coverage area of one to thirty-nine meters (i.e., 2 to 40 minus 1 equals 1 to 39) when compared to the IrDA technology, has about the same cost for a portable device when compared to the IrDA technology, and has a marginally increased cost for the system equipment when compared to the IrDA technology. However, a productivity gain and a convenience gain, associated with the ERIC technology due to the significant net increase in range while keeping the cost of the portable device about the same, far out weights the marginally higher cost of the system equipment employing ERIC data technology. Further details of the ERIC technology and its advantages are described with reference to the other figures in the present specification.

Moving further across the technology bar to the right, the Bluetooth technology is the first described RF technology. The Bluetooth technology has a higher mobility and cost relative to both the IrDA and ERIC IR technologies, but a lower mobility and cost relative to the IEEE 802.11, CDPD and cellular RF technologies. The range or coverage area of a system employing the Bluetooth technology is typically in the range of two meters to ten meters, depending on a particular Bluetooth technology specification employed. Although the range or coverage area of the Bluetooth technology (i.e., 2 to 10 meters) is typically the same or less than the ERIC technology (i.e., 2 to 40 meters), the mobility of a portable device employing the Bluetooth technology is ranked on the mobility scale as higher than the ERIC technology because the Bluetooth technology employs RF signals that can be transmitted through most solid, nonmetal objects and typically do not need to have a line of sight as required by the ERIC technology. The cost of a system employing the Bluetooth technology is greater than that of a system employing the ERIC technology because transmitting and receiving a RF signal is more complex than transmitting and receiving an IR signal. Hence, the significant net range or coverage area gain of 30 meters (i.e., 40 minus 10 meters) of the ERIC technology combined with the lower cost of the ERIC technology when compared to the Bluetooth technology make the ERIC technology more advantageous than the Bluetooth technology for applications and environments anticipated by the ERIC technology even though the ERIC technology requires line of sight operation.

Moving further across the technology bar to the right, the IEEE 802.11 technology is the next described RF technology. The IEEE 802.11 technology has a higher mobility and cost relative to both the IrDA and ERIC IR technologies and the Bluetooth RF technology, but a lower mobility and cost relative to the CDPD and cellular RF technologies. The range or coverage area of a system employing the IEEE 802.11 technology is typically in the range of two meters to forty-five meters, depending on a particular Bluetooth technology specification employed. Although the range or coverage area of the IEEE 802.11 technology (i.e., 2 to 45 meters) is typically about the same as the ERIC technology (i.e., 2 to 40 meters), the mobility of a portable device employing the IEEE 802.11 technology is ranked on the mobility scale as higher than the ERIC technology because the IEEE 802.11 technology employs RF signals that can be transmitted through most solid, nonmetal objects and typically do not need to have a line of sight as required by the ERIC technology. The cost of a system employing the IEEE 802.11 technology is greater than that of a system employing the ERIC technology because transmitting and receiving a RF signal is more complex than transmitting and receiving an IR signal. Hence, the similar range or coverage area (i.e., 2 to 40 meters) of the ERIC technology combined with the lower cost of the ERIC technology when compared to the IEEE 802.11 technology makes the ERIC technology more advantageous than the IEEE 802.11 technology for applications and environments anticipated by the ERIC technology even though the ERIC technology requires line of sight operation.

Moving further across the technology bar to the right, the CDPD technology is the next described RF technology. The CDPD technology has a higher mobility and cost relative to both the IrDA and ERIC technologies and the Bluetooth and IEEE 802.11 technologies, but a slightly lower mobility and cost relative to the cellular RF technology. Moving further across the technology bar to the right, the cellular technology is the next described RF technology. The cellular technology has a higher mobility and cost relative to the IrDA and ERIC technologies and the Bluetooth, IEEE 802.11 and CDPD technologies, but a lower mobility and cost relative to other RF technologies, such as a satellite cellular system, for example. The range or coverage area of a system employing the CDPD or cellular technology is typically in the range of several kilometers (i.e., thousands of meters), depending on factors such as system loading, capacity, geography of the coverage area, and the like. The mobility of the CDPD or cellular technology is much higher than that of the ERIC technology because of the much greater range (i.e. kilometers) over that of the ERIC technology (i.e., 2 to 40 meters) and because the CDPD or cellular technology employs RF signals that can be transmitted through most solid, nonmetal objects and typically do not need to have a line of sight as required by the ERIC technology. However, the cost of a system employing the CDPD or cellular technology is also much greater than that of a system employing the ERIC technology because transmitting and receiving a RF signal over a range of kilometers is more complex than transmitting and receiving an IR signal over a range of two to forty meters. Hence, although the CDPD or cellular technology has much higher mobility than that of the ERIC technology, the much lower cost of the ERIC technology over the cost of the CDPD or cellular technology makes the ERIC technology more advantageous than the CDPD or cellular technology for applications and environments anticipated by the ERIC technology even though the ERIC technology requires line of sight operation.

E. Design Methodology

Figure 6:
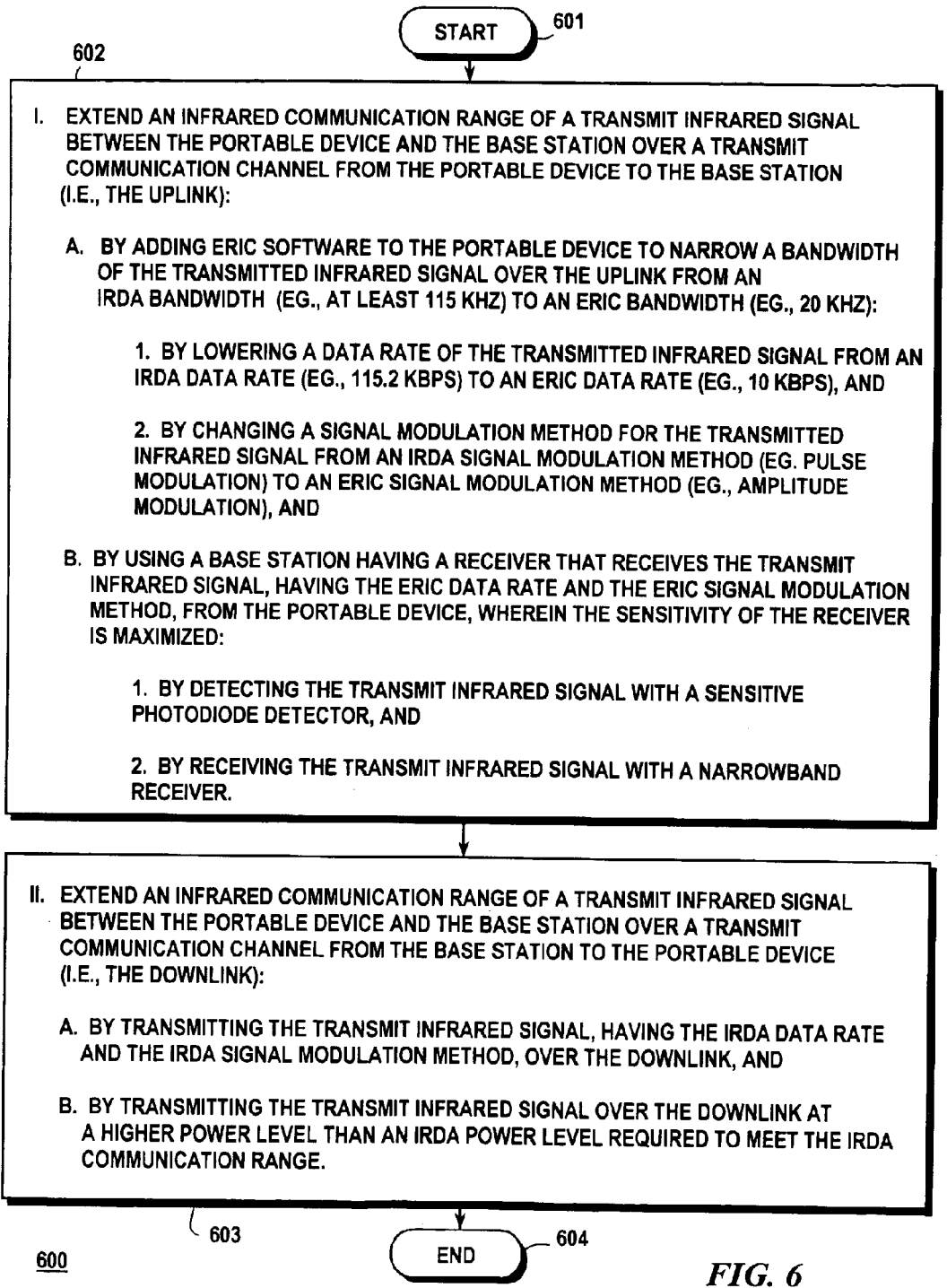
FIG. 6 illustrates a flowchart describing steps of a design methodology for enabling the base station to communicate with the portable device, each shown in FIG. 2, over the extended range infrared communication (ERIC) range, shown in FIGS. 2 and 4, greater than the IrDA compliant communication range, shown in FIGS. 1 and 3, in accordance with a first preferred embodiment of the present invention.

FIG. 6 illustrates a flowchart 600 describing steps of a design methodology for enabling the base station 202 to communicate with the portable device 201, each shown in FIG. 2, over the extended range infrared communication (ERIC) range 209, shown in FIGS. 2 and 4, greater than the IrDA compliant communication range 109, shown in FIGS. 1 and 3, in accordance with the first preferred embodiment of the present invention. The flowchart 600 generally includes steps 601, 602, 603 and 604. Generally, the ERIC range is accomplished by extending the transmission range over the uplink channel 207, at step 602, and by extending the transmission range over the downlink channel 208, at step 603, as described below.

At step 601, the flowchart 600 starts.

At step 602, the IR communication range of an IR transmit signal is extended over the uplink channel 207. By extending the transmission range over the uplink channel 207, the portable device 201 can communicate with the base station 202 at a greater distance.

The ERIC range 207 over the uplink channel 207 is generally accomplished by two steps: step I.A and step I.B. At step I.A, an IrDA compliant portable device is modified by adding ERIC software to the IrDA compliant portable device, while reusing the same hardware in the IrDA compliant portable device. The ERIC software narrows a bandwidth of the IR transmit signal 215 over the uplink channel 207 from an IrDA compliant bandwidth (e.g., at least 115.2 KHz) to an ERIC bandwidth (e.g., 20 KHz).

The ERIC bandwidth is generally accomplished by two steps: step I.A.1 and step I.A.2. At step I.A.1, the data rate of the IR transmit signal is lowered from an IrDA data rate (e.g., 115.2 kbps) to an ERIC data rate (e.g., 10 kbps). At step I.A.2., the signal modulation method for transmitting the IR transmit signal 215 from an IrDA signal modulation method (e.g. pulse modulation) to an ERIC signal modulation method (e.g., amplitude modulation).

At step I.B, the base station uses a receiver designed to receive the IR transmit signal 215, having the ERIC data rate and the ERIC modulation method, over the uplink channel 207. The sensitivity of the receiver 212 is maximized using two steps: step I.B.1 and step I.B.2. At step I.B.1, the sensitivity of the receiver 212 is maximized by detecting the IR transmit signal 215 with asensitive photodiode detector. At step I.B.2, the receiver sensitivity is maximized by receiving the IR transmit signal 215 with a narrowband receiver 212.

At step 603, the IR communication range of an IR transmit signal 216 is extended over the downlink channel 208. By extending the transmission range over the downlink channel 208, the base station 202 can communicate with the portable device 201 at a greater distance. The ERIC range 208 over the downlink channel 208 is generally accomplished by two steps: step II.A and step II.B.

At step II.A, the base station 202 transmits the IR transmit signal 216, having an IrDA data rate (e.g., 115.2 kbps) and the IrDA signal modulation method, over the downlink channel 208.

At step II.B, the base station 202 transmits the IR transmit signal 216, having an IrDA data rate (e.g., 115.2 kbps) and the IrDA signal modulation method, over the downlink channel 208 at a higher power level than an IrDA power level required to mcet the IrDA communication range. A higher power IR transmit signal 216 advantageously carries a signal farther than a lower power IR transmit signal 116, for example.

At step 604, the flowchart 600 ends.

The design methodology applies not only to infrared communications, but also other communications systems such as, for example, radio frequency (RF) systems including, without limitation, the Bluetooth system and the IEEE 802.11 standard.

F. Combinations of the Communication System

Figure 7:
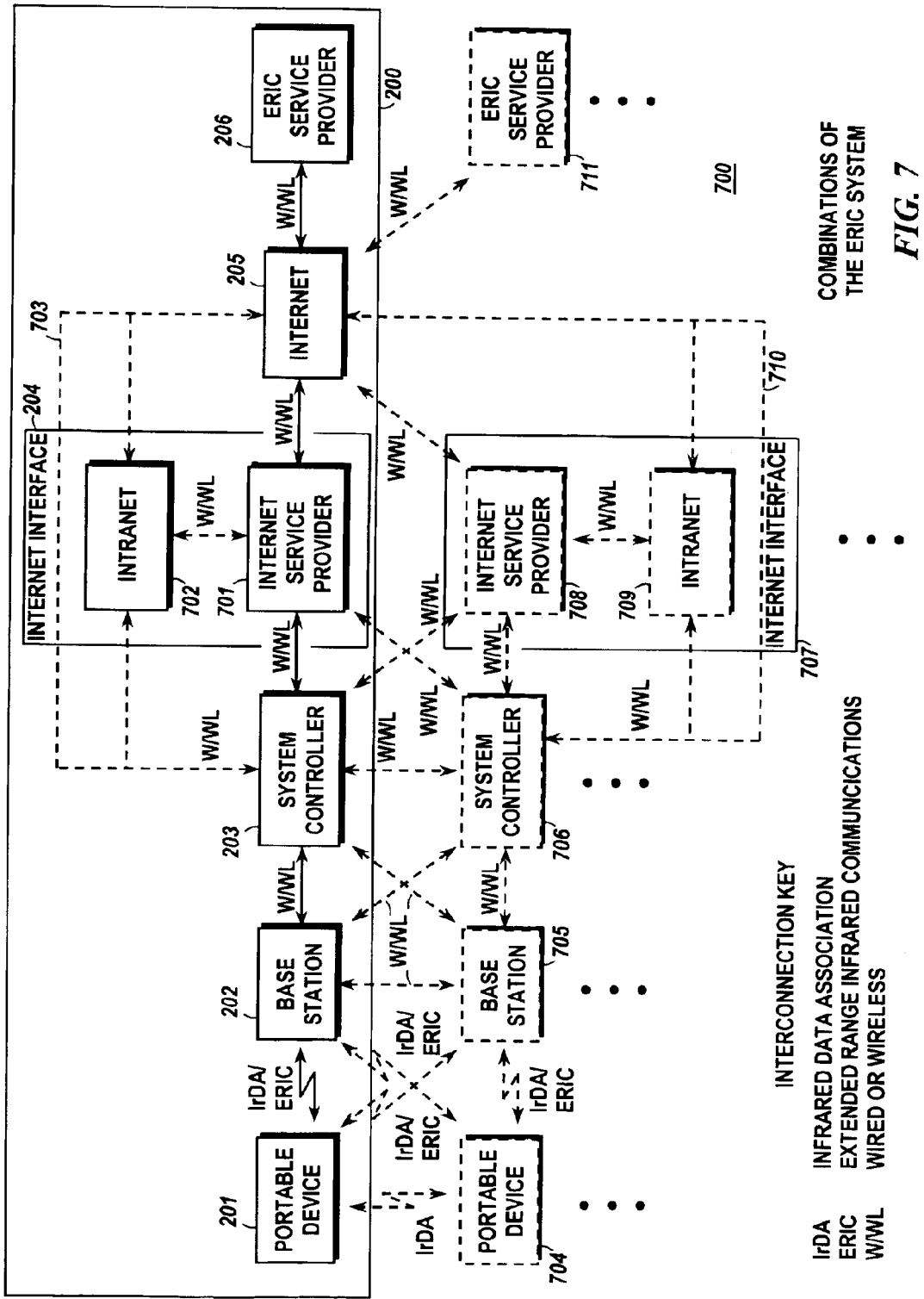
FIG. 7 illustrates a block diagram of a plurality of combinations of the communication system shown in FIG. 2, in accordance with a first preferred embodiment of the present invention.

FIG. 7 illustrates a block diagram of a plurality of combinations 700 of the communication system 200 shown in FIG. 2 in accordance with the first preferred embodiment of the present invention. In FIG. 7, various connections or links between the blocks are identified as infrared data association (IrDA), extended range infrared communication (ERIC) and wired/wireless (W/WL). The IrDA link is well known in the field of infrared communication. The ERIC link is described in the present specification. The W/WL link is also well known in the field of communication. The wired link may be any type of physical line connection, such as, for example, RS-232, coaxial cable, Ethernet unshielded twisted pair cable, electrical power lines, phone lines, and the like. The wireless link may be any type of wireless connection, such as, for example, RF, IR, microwave, and the like.

Any combination of the individual blocks in FIG. 7 may be used to create various communication system configurations. Examples of combinations are described, without limitation, as follows. The portable device 201 may communicate with the portable device 704. For example, this is the conventional IrDA "beaming" mode to transfer files such as business cards or small software routines.

The portable device 201 may communicate with two base stations 202 and 705. For example, this is the case where the coverage area of the ERIC system is larger than a single cell of coverage, such as in an enterprise or airport environment.

The base station 202 may communicate with two portable devices 201 and 704. For example, this is the case where a single base station 202 services multiple users having portable devices, such as in an enterprise or airport environment.

The base station 202 may communicate with the base station 705. For example, this is the case where the base stations are directly networked together to create a larger coverage area.

The base station 202 may communicate with two system controllers 203 and 706. For example, this is the case where multiple system controllers share the flow of communication traffic from one base station.

The system controller 203 may communicate with two base stations 202 and 705. For example, this is the case where multiple base stations are used to expand the coverage area of communications.

The system controller 203 may communicate with the system controller 706. For example, this is the case where multiple system controllers share responsibility for the system in case of a failure of one of the system controllers or when the communication load on one of the system controllers is too high for the one system controller to handle.

The system controller 203 may communicate with two internet interfaces 204 and 707. For example, this is the case where alternate paths to the internet are available depending on factors such as speed, security, services, and the like.

The internet interface 204 may communicate with two system controllers 203 and 706. For example, this is the case where multiple system controllers manage the communications in the ERIC system 200 and all communications are routed through the same internet interface 204, such as in an enterprise environment.

The internet interface 204 may communicate with the internet interface 707 via the internet 205. The internet 205 may communicate with one or more ERIC service providers 206 and 711. The internet interface 204 generally includes an internet service provider 701, an intranet 702 and a direct path 703, such as a T1 line. The intranet 702 may be a corporate intranet, for example. The system controller 203 may communicate with the internet service provider 701, with the intranet 702 or over a direct path 703. The continuation dots at the bottom of the figure represent that the plurality of the combinations of the communication system 200 continue on indefinitely. Hence, an unlimited number of combinations of the communication system 200 may be configured to serve various anticipated user environments and coverage areas.

G. Examples of the Combinations of the Communication System

FIG. 8 illustrates a table 800 describing examples of the plurality of combinations 700 of the communication system 200, shown in FIG. 7, designed to provide corresponding coverage areas to serve corresponding user environments in accordance with the first preferred embodiment of the present invention.

In the first listed example, the anticipated environment is for a private individual, such as used in a home or an office. In this case, the coverage area of the system is individual and very small. Preferably, the base station 202 would be a relatively small unit, similar to the size of a conventional IrDA docking station, that a person can set on their desk or table next to their personal computer. One or more portable devices 201 (1+) communicates with preferably one base station 202 that communicates with preferably one system controller 203 that communicates with preferably one internet interface 204. In this example, the base station 202 would be designed to operate in either the IrDA communication mode or the ERIC communication mode so that private individuals can take advantage of the conventional IrDA applications as well as the ERIC applications.

In the second listed example, the anticipated environment is for a small private group, such as used in a conference room. In this case, the coverage area of the system may be small and not networked or small and networked. In the not networked case, one or more portable devices 201 (1+) communicates with preferably one base station 202 that does not communicate with either a system controller 203 or an internet interface 204. Preferably, in the not networked case, the base station 202 would be a relatively small unit, similar to the size of a conventional IrDA docking station, that is placed on a table or mounted on a wall or ceiling in the conference room. In the networked case, one or more portable devices 201 (1+few) communicates with preferably one or more base stations 202 (1+few) that communicates with one or more system controllers 203 (1+few) that communicates with one or more internet interfaces 204 (1+). Preferably, in the networked case, the base station 202 would be a relatively small unit that is mounted on a wall or ceiling to provide an unobstructed coverage area.

In the third listed example, the anticipated environment is for a small public group, such as used in an airport, hotel or enterprise. In this case, the system has a medium coverage area. One or more portable devices 201 (1+several) communicates with preferably one or more base stations 202 (1+several) that communicates with one or more system controllers 203 (1+several) that communicates with one or more internet interfaces 204(1+several). Preferably, in third listed example, the base station 202 would be a relatively small unit that is mounted on a wall or ceiling to provide an unobstructed coverage area.

In the fourth listed example, the anticipated environment is for a large public group, such as the state, country or world. In this case, the system has a large coverage area. One or more portable devices (1+many) communicates with preferably one or more base stations (1+many) that communicates with one or more system controllers (1+many) that communicates with one or more internet interfaces 204 (1+many). Preferably, in fourth listed example, the base station 202 would be a relatively small unit that is mounted on a wall or ceiling to provide an unobstructed coverage area.

The table 800 describes several examples of how the plurality of combinations 700 of the communication system 200, shown in FIG. 7, may be deployed to provide a practical reference to the plurality of combinations 700 of the communication system 200. The notation "1+" are meant to describe "one or more". The notations "few," "several," and "many" are meant to provide a relative distinction between various parts of a system that may have one or more parts. Hence, the table 800 generally describes, without limitation, a user environment ranging from a private individual to the entire world with corresponding coverage areas.

H. Portable Device

1. Block Diagram

Figure 9:
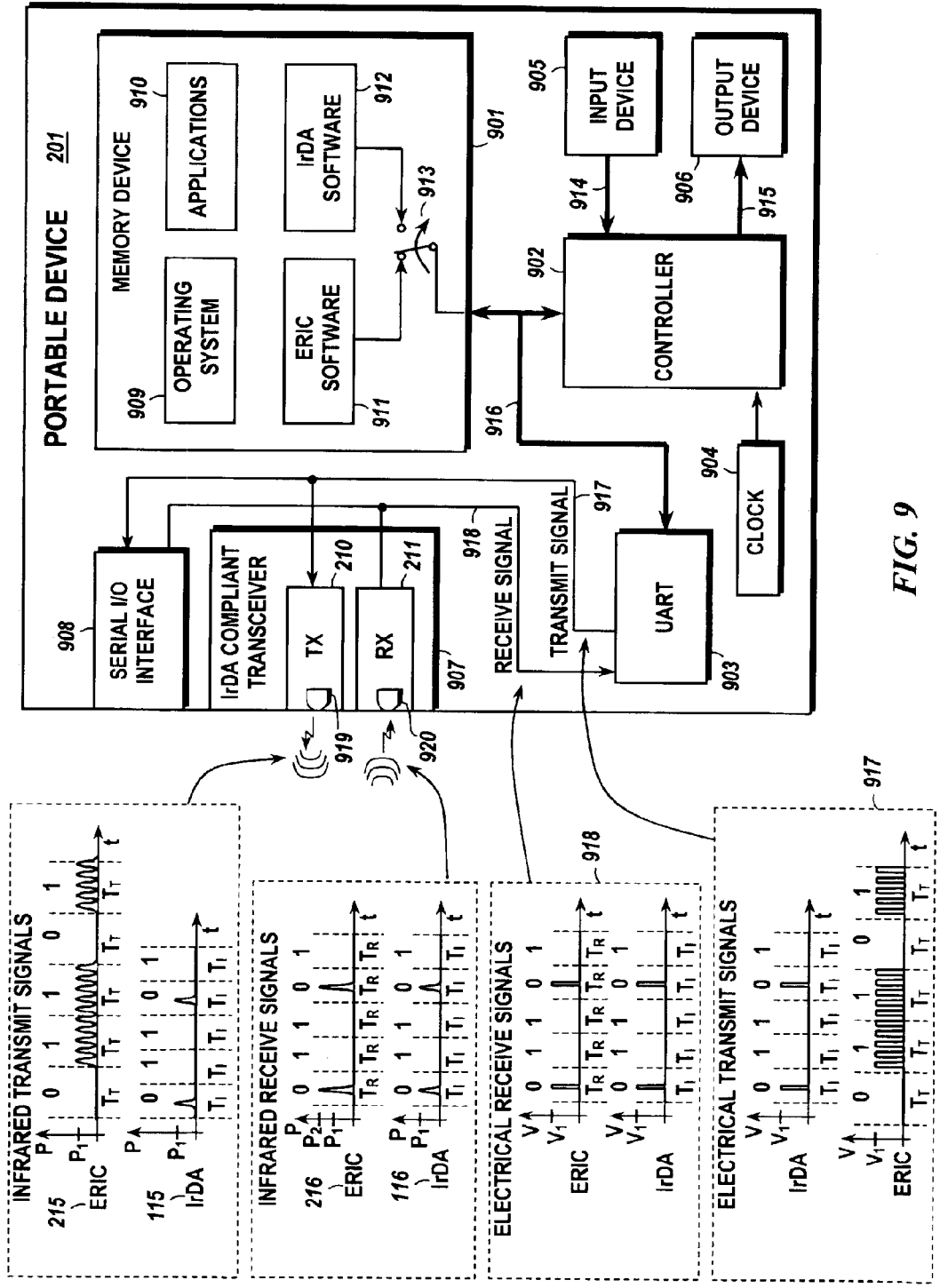
FIG. 9 illustrates a block diagram of the portable device, shown in FIG. 2, in accordance with a first preferred embodiment of the present invention.

FIG. 9 illustrates a block diagram of the portable device 201, shown in FIG. 2, in accordance with the first preferred embodiment of the present invention. The portable device 201 generally includes a memory device 901, a controller 902, a universal asynchronous receiver transmitter (UART) 903, a clock 904, an input device 905, an output device 906, an IrDA compliant transceiver 907 and a serial input/output (I/O) interface 908, each of which is individually well known in the art. The IrDA compliant transceiver 907 generally includes a transmitter 210, having a near infrared emitter diode 919, and a receiver 211, having a near infrared detector diode 920, each of which is individually well known in the art. The memory device 901 further includes operating system software 909, application software 910, ERIC software 911, IrDA software 912, and a software switch 913. Generally, operating system software 909 and the application software 910 are each individually well known in the art. The ERIC software 911, IrDA software 912, and a software switch 913 are the subject of the first preferred embodiment of the present invention.

In the first preferred embodiment of the present invention, the portable device 201 comprises a first communication mode adapted to permit the portable device 201 to transmit an IrDA signal 917 and 115 and to receive an IrDA signal 918 and 116 over a first communication range 109. The portable device 201 further comprises a second communication mode adapted to permit the portable device 201 to transmit an ERIC signal 917 and 215 and to receive an ERIC signal 918 and 216 over a second communication range 209 that is greater than the first communication range 109. The first communication mode is generally referred to as an IrDA communication mode. The second communication mode is generally referred to as the ERIC communication mode.

The IrDA compliant transceiver includes the transmitter 210 adapted to transmit the IrDA signal 115 over the first communication range 109 when the portable device 210 is operating in the first communication mode and adapted to transmit the ERIC signal 215 over the second communication range 209 when the portable device 201 is operating in the second communication mode.

The transmitter 210 further includes the near infrared emitter diode 919 adapted to convert a transmit signal from an electrical signal 917 into an infrared signal 115 or 215 that is representative of the electrical signal 917, wherein the transmit signal represents the IrDA signal 115 when the portable device 201 is operating in the first communication mode, and wherein the transmit signal represents the ERIC signal 215 when the portable device 201 is operating in the second communication mode. The ERIC electrical transmit signal 917 has a different data rate and a different signal modulation method than the IrDA electrical transmit signal 917. The ERIC infrared transmit signal 215 has a different data rate and a different signal modulation method than the IrDA infrared transmit signal 115, but has the same power level, P1, as the IrDA infrared transmit signal 115. The power level, P1, is the same because preferably no hardware in the portable device is changed, including the current limiting resistor in the IrDA compliant transceiver that sets the power level of the infrared signals 115 or 215 transmitted by the transmitter 210.

The IrDA compliant transceiver further includes the receiver 211 adapted to receive the IrDA signal 116 over the first communication range 109 when the portable device 201 is operating in the first communication mode, and adapted to receive the ERIC signal 216 over the second communication range 209 when the portable device 201 is operating in the second communication mode.

The receiver 211 further includes the near infrared detector diode 920 adapted to convert a receive signal from an infrared signal 116 or 216 into an electrical signal 918 that is representative of the infrared signal 116 or 216, wherein the receive signal represents the IrDA signal 116 when the portable device 201 is operating in the first communication mode, and wherein the receive signal represents the ERIC signal 216 when the portable device 201 is operating in the second communication mode. The ERIC infrared receive signal 216 has the same IrDA signal modulation method and the same IrDA data rate, as the IrDA infrared receive signal 116, but has a higher power level, P2, than the power level, P1, of the IrDA receive signal 116. For clarification, note that the infrared receive signals 116 and 216 are referenced at the base station 202 transmitter 213 and that the infrared transmit signals 115 and 215 are referenced at the portable device 201 transmitter 210, since the power level of an infrared signal is known at a transmitter and can only be measured at a corresponding receiver due to various channel conditions.

The memory device 901 includes a first software routine (i.e., the IrDA software) 912 adapted to cause the portable device 201 to operate in the first communication mode, and a second software routine (i.e., the ERIC software) 911 adapted to cause the portable device 201 to operate in the second communication mode. The memory device 901 includes any type of memory including, without limitation, read only memory (ROM), random access memory (RAM), FLASH memory, electrically eraseable programmable only memory (EEPROM), and the like, as are well known in the art. Preferably, the memory device 901 is RAM.

In the first preferred embodiment of the present invention, the ERIC software 911 is loaded into the portable device 201 by using the conventional IrDA beam mode for transferring data. For example, the ERIC software 911 may be downloaded from another IrDA compliant portable device already having the ERIC software 911, from the base station 202 or from a download station (not shown). Note that the conventional IrDA beam mode for transferring data is limited to the IrDA range 109 of about one meter so the other IrDA compliant portable device, the base station or the download station must be within the IrDA range 109 of one meter from the portable device receiving the ERIC software. Alternatively, the ERIC software 911 may be downloaded through a personal computer over the internet, using a docking station with a hardware signal connection or using the conventional IrDA beam mode. Alternatively, the ERIC software 911 may be an embedded software program that is included in a read only memory device when the memory is designed and manufactured for a particular portable device. Alternatively, the ERIC software 911 may be downloaded from base station 202.

The controller 902 is adapted to control a selection of one of the first communication mode and the second communication mode, via the software switch 913 in the memory device, over a communication bus 916 responsive to a communication mode control signal. The communication mode control signal may be manually generated by the user, such as via the input device 905, or may be generated automatically, such as when application software 910 is used or launched. The software switch 913 generally represents a software command sent to the memory device 901 from the controller 902 to select either the IrDA software 912 or the ERIC software 911.

The input device 905 is adapted to generate an input signal 914 for controlling the portable device 201 when the portable device 201 is operating in the first communication mode or the second communication mode. The input device 905 includes, without limitation, a keypad, a touch screen, a cursor controller (e.g., mouse, track ball, track pad, or joy stick) a voice input, and the like, as are well known in the art.

The output device 906 is adapted to generate an output signal 915 responsive to receiving the IrDA electrical signal 918 when the portable device 201 is operating in the first communication mode and responsive to receiving the ERIC electrical signal 918 when the portable device is operating in the second communication mode. The output device 906 includes, without limitation, a display, an audio output such as a loudspeaker or an earpiece speaker, and the like, as are well known in the art.

The clock 904 provides a reference clock signal to control the timing of the operation of the circuits in the portable device 201, including the data rate of the IR transmit signal 115 or 215.

The serial I/O interface 908 provides an alternate port for transmitting and receiving information without using the IrDA compliant transceiver 907. The serial I/O interface 908 is well known in the art and includes, for example, the RS-232 signal interface.

2. Flowchart

Figure 10:
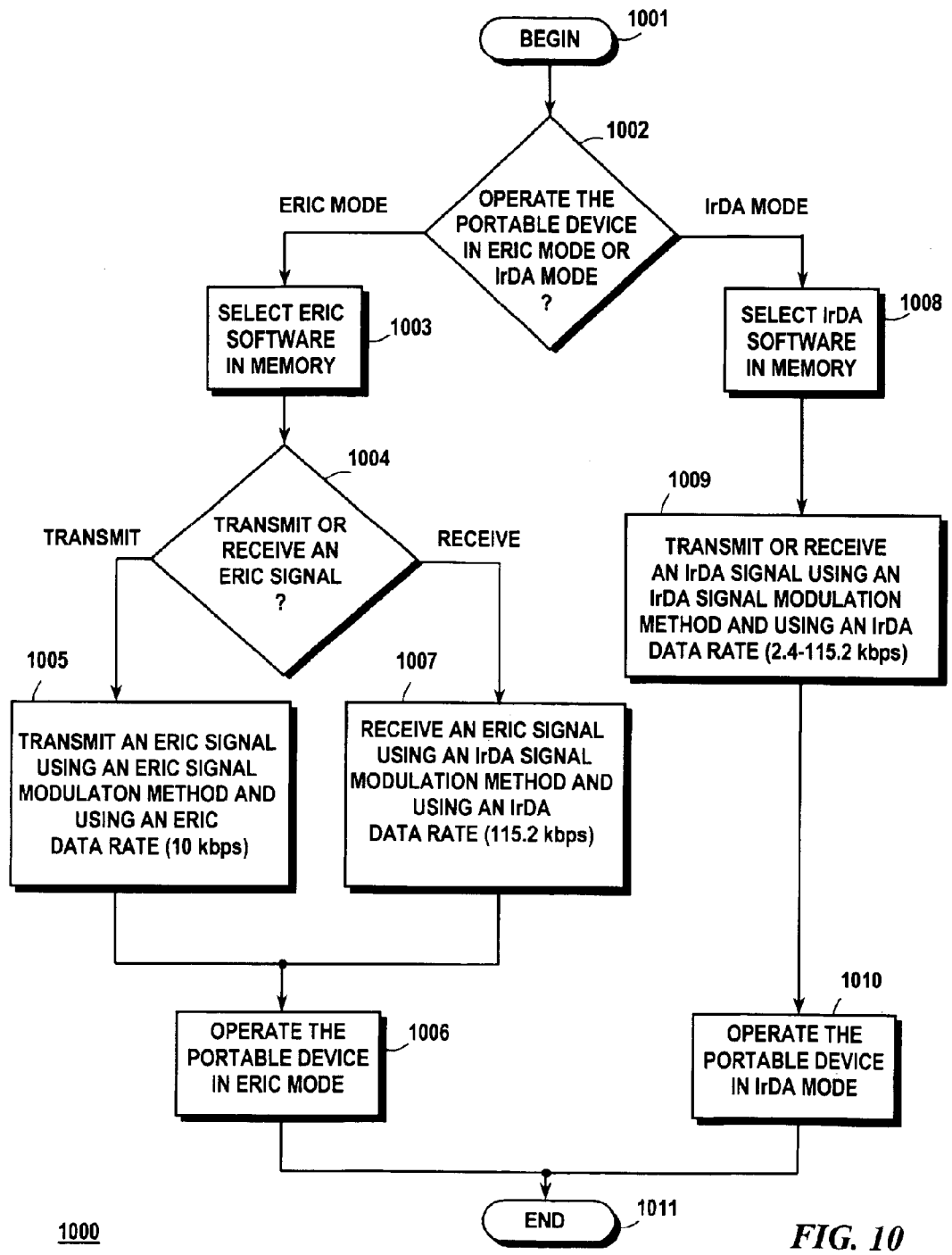
FIG. 10 illustrates a flowchart describing steps of a method of operation performed by the portable device, shown in FIG. 9, in accordance with a first preferred embodiment of the present invention.

FIG. 10 illustrates a flowchart 1000 describing steps of a method of operation performed by the portable device 201, shown in FIG. 9, in accordance with the first preferred embodiment of the present invention.

At step 1001, the flowchart 1000 begins.

At step 1002, the portable device 201 makes a determination whether to operate the portable device 201 in the ERIC communication mode or the IrDA communication mode. The determination may be made manually generated by the user, such as via the input device 905, or may be made generated automatically, such as when application software 910 is used or launched.

At step 1003, the portable device 201 selects the ERIC software 911 in the memory device 901, via the software switch 913, responsive to the portable device 201 making the determination to operate in the ERIC communication mode at step 1002. Practically, the controller 902 makes the selection by sending a command over the communication bus 916 to the memory device 901 to enable the ERIC software routine.

At step 1004, the portable device 201 makes a determination whether to transmit an ERIC signal 215 Or receive an ERIC signal 216 in the ERIC communication mode responsive to the portable device 201 selecting the ERIC software 911 in the memory device 901 at step 1003. This determination is made because the ERIC transmit signal 215 is different from the ERIC receive signal 216 and various permissible modifications to the portable device 201 must be made as the portable device 201 transits or receives information. In the first preferred embodiment of the present invention, the IrDA compliant transceiver operates in a simplex mode, wherein either the transmitter 210 or the receiver 211 operates at one time. Hence, when the portable device 201 transmits information, the portable device 201 needs to be configured for the transmit mode, and when the portable device 201 receives information, the portable device 201 needs to be configured for the receive mode. This periodic reconfiguring of the portable device 201 is not detrimental to the operation of the portable device 201 because of the volume of data generated in the transmit mode versus the receive mode and because of the frequency of use of the transmit mode versus the receive mode. For example, the transmit mode is typically used to generate relatively small amounts of data, such as commands, instructions or selections; whereas, the receive mode is typically used to receive relatively large amounts of data, such as a data file, a graphical file, a digital photo, a web site display, and the like. Further, a user typically uses the transmit mode less frequently than the receive mode because the user enters a command or selection in the transmit mode, then stops for a while to review the data received while in the receive mode.

At step 1005, the portable device 201 transmits the ERIC signal 215 using an ERIC signal modulation method (e.g. amplitude modulation) and using an ERIC data rate (e.g., 10 kbps) responsive to the portable device 201 making the determination to transmit the ERIC signal 215 in the ERIC communication mode at step 1004. FIGS. 13–16 describe further detai Is of how the portable device 201 generates the ERIC signal 215.

At step 1006, the portable device 201 operates in the ERIC communication mode responsive to the portable device 201 transmitting the ERIC signal 215 or receiving the ERIC signal 216 at steps 1005 and 1007, respectively. In the ERIC communication mode, the portable device 201 may use any application described herein under the detailed description, section J, in any commercial market setting described herein under the detailed description, section K.

At step 1007, the portable device 201 receives the ERIC signal 216 using an IrDA signal modulation method (e.g. pulse modulation) and using an IrDA data rate (e.g., 115.2 kbps) responsive to the portable device 201 making the determination to receive the ERIC signal 216 in the ERIC communication mode at step 1004. Hence, although the ERIC signal 216 is transmitted from the base station 202 at a higher power level than that of the IrDA signal 116 the same receiver IrDA software and IrDA hardware in the portable device 201 are advantageously used to receive the ERIC signal 216.

At step 1008, the portable device 201 selects the IrDA software 912 in the memory device 901 via the software switch 913 responsive to the portable device 201 making the determination to operate in the IrDA communication mode at step 1002. Practically, the controller 902 makes the selection by sending a command over the communication bus 916 to the memory device 901 to enable the IrDA software routine.

At step 1009, the portable device 201 transmits an IrDA signal 115 or receives an IrDA signal 116 using an IrDA signal modulation method (e.g. pulse modulation) and using an IrDA data rate (e.g., 115.2 kbps) responsive to the portable device 201 selecting the IrDA software 912 in the memory device 901 at step 1008. Since the signal modulation method and the data rate is the same for each of the IrDA transmit signal 115 and the IrDA receive signal 116, there is no need to periodically reconfigure the software or the hardware in the portable device 201 when the portable device 201 transmits the IrDA transmit signal 115 or receives the IrDA receive signal 116.

At step 1010, the portable device 201 operates in the IrDA communication mode responsive to the portable device 201 transmitting the IrDA signal 115 or receiving the IrDA signal 116 at step 1009. In the IrDA communication mode, the portable device 201 may use any conventional IrDA application in any conventional IrDA setting, as is well known in the art.

At step 1011, the flowchart 1000 ends.

3. Open System Interconnection (OSI)—Reference Model

FIG. 12 illustrates an extended range infrared communication (ERIC) open system interconnection (OSI)—Reference Model 1200 including an ERIC protocol stack 1213 used by the portable device 201, shown in FIG. 9, in accordance with the first preferred embodiment of the present invention.

The OSI 1200 describes the operation of the portable device 201 in the ERIC communication mode 1203 and the IrDA communication mode 1204, as indicated at the top of the OSI 1200. Note that a dotted line essentially splits the OSI 1200 down the middle of the OSI 1200 to separate the functions associated with the ERIC communication mode 1203 on the left hand side of the OSI 1200 from the functions associated with the IrDA communication mode 1204 on the right hand side of the OSI 1200. The OSI 1200 generally includes an IrDA SIR physical layer 1202, otherwise known as hardware 1202, and includes a memory 1201, otherwise known as software, as indicated at the right hand side of the OSI 1200. Within the OSI 1200 generally note that the shaded blocks indicate subject matter added to the OSI 1200, in accordance with the first preferred embodiment of the present invention.

The hardware 1202 generally includes an IrDA compliant transceiver 1205 and a universal asynchronous receiver transmitter (UART), including IrDA transmit encoding 1206, IrDA receive decoding 1207 and ERIC transmit encoding 1208. The IrDA receive decoding 1207 and the ERIC transmit encoding 1208 are used in the ERIC communication mode 1203, and that the IrDA receive decoding 1207 and the IrDA transmit encoding 1206 are used in the IrDA communication mode 1204. Hence, the IrDA receive decoding 1207 is used for both the ERIC communication mode 1203 and the IrDA communication mode 1204 when the portable device 201 is receiving the infrared receive signal 116 or 216.

Although the ERIC transmit encoding is a shaded block, indicating new subject matter added to the OSI 1200, in accordance with the first preferred embodiment of the present invention, and is described as being UART hardware, no new hardware has been added to the UART 903 in the portable device 201. The ERIC transmit encoding 1208 is shaded because of the way in which the conventional UART is configured in order to transmit the ERIC encoded signal 917, in accordance with the first preferred embodiment of the present invention.

The software 1201 generally includes transmit and receive software drivers 1209, IrDA protocol 1210; IrDA only application software 1211, ERIC transmit software 1212, ERIC protocol 1213, ERIC only application software 1214, application software 1215 that is compatible with both the ERIC communication mode 1203 and the IrDA communication mode 1204, and the operating system software 1216. The transmit and receive software drivers 1209 are used for both the ERIC communication mode 1203 and the IrDA communication mode 1204. The IrDA protocol 1210 and the IrDA only application software 1211 are only used for the IrDA communication mode 1204. The ERIC transmit software 1212, ERIC protocol 1213, ERIC only application software 1214 are only used for the ERIC communication mode 1203. Finally, the application software 1215 is used with either the ERIC communication mode 1203 or the IrDA communication mode 1204.

Preferably, the ERIC protocol 1213 is designed to accommodate communications with multiple users at one time. Alternatively, the ERIC protocol 1213 may be designed to accommodate only one user at a time. The design of the ERIC protocol 1213 is dependent on various design considerations, such as the anticipated communication environment, the anticipated number of users, the anticipated type of communications, and the like.

4. Universal Asynchronous Serial Transceiver (UART)

Figure 13:
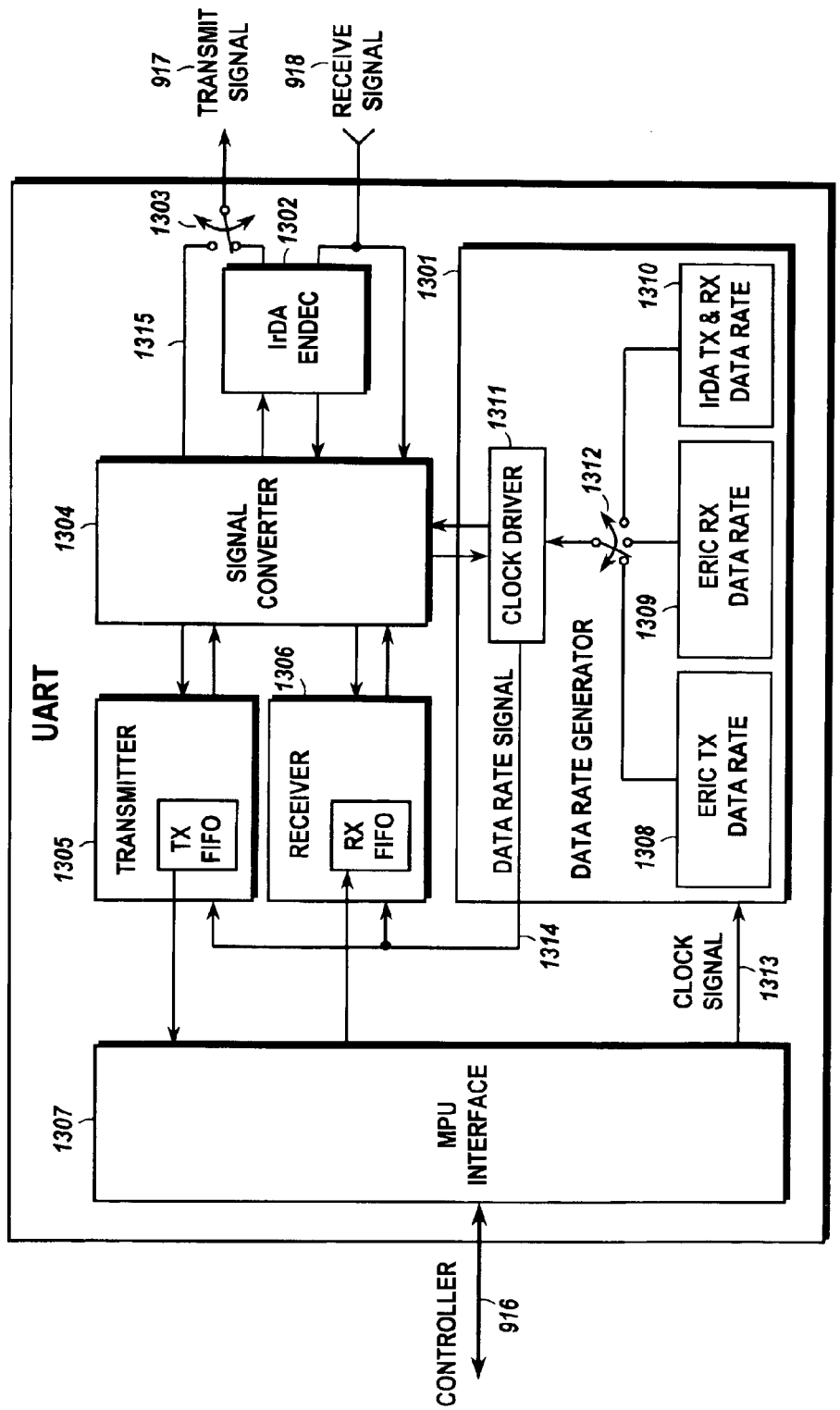
FIG. 13 illustrates a block diagram of a universal asynchronous serial transceiver (UART) used in the portable device, shown in FIG. 9, in accordance with a first preferred embodiment of the present invention.

FIG. 13 illustrates a block diagram of a universal asynchronous serial transceiver (UART) 903 used in the portable device 201, shown in FIG. 9, in accordance with the first preferred embodiment of the present invention. The UART 903 generally includes a data rate generator 1301, an IrDA encoder/decoder (ENDEC) 1302, an interface switch 1303, a signal converter 1304, a transmitter 1305, a receiver 1306 and a microprocessor unit (MPU) interface 1307. The data rate generator 1301 generally includes an ERIC Tx data rate 1308, an ERIC Rx data rate 1309, an IrDA Tx and Rx data rate 1310, a clock driver 1311 and a data rate switch 1312. Generally, the data rate generator 1301, the IrDA interface 1302, the interface switch 1303, the signal converter 1304, the transmitter 1305, the receiver 1306 and the microprocessor unit (MPU) interface 1307 are each individually well known in the art of UART design. Generally, the data rate generator 1301 including the ERIC Tx data rate 1308, the ERIC Rx data rate 1309, the IrDA Tx and Rx data rate 1310, the clock driver 1311 and the data rate switch 1312, as well as a new use for the interface switch 1303 are the subject of the first preferred embodiment of the present invention.

The data rate generator 1301 is adapted to cause the portable device 201 to transmit and to receive the IrDA signal at an IrDA data rate 1310 selected from a plurality of IrDA data rates when the portable device 201 is operating in the first communication mode, to transmit the ERIC signal 215 at a first ERIC data rate 1308 when the portable device 201 is operating in the second communication mode, and to receive the ERIC signal 216 at a second ERIC data rate 1309 when the portable device is operating in the second communication mode. In the first preferred embodiment of the present invention, the controller 902 sends a clock signal command to the UART 903 over the communication bus 916. The MPU interface 1307 in the UART 903 receives the clock signal command and generates an appropriate clock signal 1313 for the data rate generator 1301. Clock circuitry in the data rate generator 1301 generates the desired data rate to produce the data rate signal 1314 for use by the transmitter 1305 or the receiver 1306.

In the first preferred embodiment of the present invention, the first ERIC data rate 1308 (e.g. 10 kbps) is lower than the second ERIC data rate 1309 (e.g. 115.2 kbps), and the second ERIC data rate 1309 is equal to a maximum IrDA data rate (e.g. 115.2 kbps, 1.0 Mbps, 4.0 Mbps or 16 Mbps max, depending on the particular IrDA specification employed in the portable device 201). Therefore, the portable device 210 has a downlink channel 208 capacity to receive very large data files including, without limitation, digital photos, streaming video, graphics files, web site pages, and the like.

The IrDA encoder/decoder (ENDEC) 1302, generally referred to as a signal modulator/demodulator (modem), includes an IrDA signal modulator, an IrDA signal demodulator and an ERIC signal modulator. The IrDA signal modulator is adapted to transmit the IrDA signal 115 using an IrDA signal modulation method when the portable device 201 is operating in the first communication mode. The IrDA signal demodulator is adapted to receive the IrDA signal 116 using an IrDA signal demodulation method when the portable device 201 is operating in the first communication mode and is adapted to receive the ERIC signal 216 using the IrDA signal demodulation method when the portable device 201 is operating in the second communication mode. The ERIC signal modulator is adapted to transmit the ERIC signal 115 using an ERIC signal modulation method when the portable device 201 is operating in the second communication mode. In the first preferred embodiment of the present invention, the ERIC signal modulation method further comprises amplitude modulation (AM). The amplitude modulation (AM) preferably comprises a main carrier signal representing the ERIC signal at an infrared frequency, and a subcarrier signal, modulated onto the main carrier signal, representing the ERIC signal at the first ERIC data rate 1308.

The signal modem further comprises the IrDA compliant signal encoder/decoder (ENDEC) 1302 including a signal encoder, a signal bypass path 1315 and a signal decoder. The signal encoder is adapted to encode the IrDA signal, using the IrDA signal modulation method, to generate an encoded IrDA signal when the portable device is transmitting the IrDA signal 115 in the first communication mode. The signal bypass path 1315 is coupled to an input terminal and an output terminal of the signal encoder and is adapted to route the ERIC signal, having the ERIC signal modulation method, around the signal encoder, via the switch 1302, when the portable device 201 is transmitting the ERIC signal 215 in the second communication mode. Therefore, the signal bypass path 1315 permits the ERIC signal to bypass the IrDA encoder so as not to alter the desired ERIC signal modulation. The signal decoder is adapted to decode the IrDA signal, using the IrDA signal demodulation method, to generate a decoded IrDA signal when the portable device is receiving the IrDA signal in the first communication mode, and is adapted to decode the ERIC signal, using the IrDA signal demodulation method, to generate a decoded ERIC signal when the portable device 201 is operating in the second communication mode.

The signal converter 1304 includes a parallel to serial signal converter and a serial to parallel signal converter. The parallel to serial signal converter is coupled to receive a transmit signal, representing the IrDA signal or the ERIC signal, and is adapted to convert the transmit signal from a parallel data format to a serial data format. The serial to parallel signal converter is coupled to receive the receive signal, representing the IrDA signal or the ERIC signal, and is adapted to convert the receive signal from a serial data format to a parallel data format. Therefore, the data sent to or received from the portable device 201 over the uplink channel 207 or over the downlink channel 208 is in a serial signal format, and the data internally processed by the portable device 201 or the base station 202 is in a parallel signal format.

Alternatively, instead of using a UART to control the IrDA compliant transceiver, an IrDA compliant super input/output (I/O), encoder/decoder (ENDEC), central processing unit (CPU) or integrated controller may be used. Application notes for a MiniSIR2 IrDA compliant transceiver, available from Novalog, Inc., describes various reference designs in which the MiniSIR2 can interface with some of the various IrDA compatible ENDECs, UARTs, CPUs and integrated controllers that are presently available. The reference designs provided by various manufacturers include: AMD®—Elan™ SC410 32 Bit MPU with IrDA ENDEC; HP®—HSDL-7000 IrDA ENDEC and HSDL-7001 IrDA ENDEC with 16× Clock and Baud Rate Generator; Hitachi®—SH-3 SuperH 32-BIT RISC Engine CPU with IrDA ENDEC for HPCs with Windows® CE; Intel®—8051 & 80C32 Microcontroller; Maxim®—MAX237 RS-232 Driver/Receiver and MAX3100 UART with IrDA ENDEC for small, low cost, microcontroller based systems; Microchip®—PIC Microcontroller; Motorola®—MC68328 DragonBall™ CPU with IrDA ENDEC and MC68HC11A8 Microcontroller; NEC® VR4101™64-Bit RISC CPU with IrDA ENDEC for HPCs with Windows® CE; Parallax Research®—PLX-1000 IrDA ENDEC and PLX-7001 IrDA ENDEC with 16× Clock and Baud Rate Generator; Phillips® PR31500 and PR31700 32-Bit RISC CPU with IrDA ENDEC for HPCs with Windows® CE; Siemens®—IRM7000 IrDA ENDEC and IRM7001 IrDA ENDEC with 16× Clock and Baud Rate Generator; Startech® ST16C650 UART with IrDA ENDEC; Temic®—TOIM3000 IrDA ENDEC, TOIM3232 IrDA ENDEC with 16× Clock and Baud Rate Generator, and Texas Instruments®—TIR1000 IrDA ENDEC and TL16PIR552 UART with IrDA ENDEC.

FIG. 14 illustrates a block diagram of a transmit signal processor 1400 that conceptually describes how a data signal 1401 is combined with a carrier signal 1402 to produce an extended range infrared communication (ERIC) transmit signal 215 in accordance with the first preferred embodiment of the present invention. FIG. 14 describes how the ERIC transmit signal 215 is conceptually or theoretically generated. In the first preferred embodiment of the present invention, the ERIC transmit signal 215 is generated by controlling the data bits applied to the UART 903, as described in FIGS. 15 and 16. The transmit signal processor 1400 generally includes a multiplier 1405. The multiplier is adapted to receive, at a first input terminal, a data signal 1401 having a preferred data rate 1403 of 10 kbps. In the data signal 1401, a high voltage level represents a logic one and a low voltage level represents a logic zero. The multiplier is further adapted to receive, at a second input terminal, a sub-carrier signal 1402 having a preferred sub-carrier frequency 1404 of 50 KHz. A main carrier signal represents the ERIC transmit signal 215 at the infrared frequency. A purpose of the sub-carrier signal 1402 is to move the main carrier signal from a DC frequency to the 50 KHz frequency to minimize noise and interference known to exist at the DC frequency. The multiplier 1405 multiplies the data signal 1401 and the sub-carrier signal 1402 produce, at the output terminal, the ERIC transmit signal 215. In the ERIC transmit signal 215, the sub-carrier signal is on 1406 during the time period of a logic one in the data signal 1401 and the sub-carrier signal is off 1407 during the time period of a logic zero in the data signal 1401.

FIG. 15 illustrates data bits applied to the UART 903, shown in FIGS. 9 and 13, causing the UART 903 to turn on 1406 a sub-carrier signal 1402 of the ERIC transmit signal 215, shown in FIG. 14, in accordance with the first preferred embodiment of the present invention. Generally, FIGS. 15 and 16 illustrate how the UART is used to produce the signal modulation for the ERIC transmit signal 215. In the first preferred embodiment of the present invention, the ERIC signal modulation method is amplitude modulation (AM). Preferably, the amplitude modulation includes the main carrier signal and the sub-carrier signal. Advantages of using the amplitude modulation method include its simplicity and low power requirements. Alternatively, other signal modulation method may be employed such a frequency modulation (FM), phase modulation (PM), and the like.

Ten data bits are transmitted from the UART at a time. The ten data bits include a start bit 1501, eight UART data bits 1502 and a stop bit 1503. The start bit 1501 and the stop bit 1503 are created in the hardware of the UART and cannot be changed. The start bit 1501, having a logic zero value, indicates the beginning of the eight data bits 1502. The stop bit 1503, having a logic one value, indicates the end of the eight data bits 1502. The value of the eight data bits 1502 are variable and are set by the controller 902 over the data bus 916 in accordance with software instructions from the memory device 901. The value of the eight data bits 1502 in combination with the value of the start bit 1501, having a logic zero value, and the value of the stop bit 1503, having a logic one value, comprise a sequence of ten data bits that define the sub-carrier on signal 1406. In the first preferred embodiment of the present invention, the value of the eight data bits 1502 has a hexadecimal value of "AA" to provide a logic sequence of 1-0-1-0-1-0-1-0. After adding the start bit 1501 logic value and the stop bit 1503 logic value to the eight data bits 1502, the sub-carrier on signal 1406 has a logic sequence of 0-1-0-1-0-1-0-1-0-1.

FIG. 16 illustrates data bits applied to the UART 903, shown in FIGS. 9 and 13, causing the UART 903 to turn off 1407 a sub-carrier 1402 of the ERIC transmit signal 207, shown in FIG. 14, in accordance with the first preferred embodiment of the present invention. Ten data bits are applied to the UART at a time. The ten data bits include a start bit 1501, eight UART data bits 1502 and a stop bit 1503. The start bit 1501 and the stop bit 1503 are created in the hardware of the UART and cannot be changed. The start bit 1501, having a logic zero value, indicates the beginning of the eight data bits 1502. The stop bit 1503, having a logic one value, indicates the end of the eight data bits 1502. The value of the eight data bits 1502 are variable and are set by the controller 902 over the data bus 916 in accordance with software instructions from the memory device 901. The value of the eight data bits 1502 in combination with the value of the start bit 1501, having a logic zero value, and the value of the stop bit 1503, having a logic one value, comprise a sequence often data bits that define the subcarrier off signal 1407. In the first preferred embodiment of the present invention, the value of the eight data bits 1502 has a hexadecimal value of "00" to provide a logic sequence of 0-0-0-0-0-0-0-1. After adding the start bit 1501 logic value and the stop bit 1503 logic value to the eight data bits 1502, the sub-carrier off signal 1407 has a logic sequence of 0-0-0-0-0-0-0-0-0-1.

Note that in the FIG. 14 of the conceptual description of the ERIC transmit signal 207, the sub-carrier off signal 1407 has a logic level zero throughout the time period corresponding to the time period when the data signal 1401 has a logic level zero. However, in FIG. 16, the sub-carrier off signal 1407 has a logic level zero for the first nine data bits, but has a logic level one in the stop bit 1503 position. The difference between the tenth bit being a logic level zero in the conceptual description of the sub-carrier off signal 1407 and the tenth bit being a logic level one in the UART processing represents the difference between theory and practice. Ideally, the tenth data bit position in the sub-carrier off signal 1407 should be a logic zero level. However, because the UART 903 controls the value of the stop bit 1503 in hardware, the stop bit 1503 must be a logic level one when the UART 903 is used. The ERIC technology, using a convention UART 903, accommodates the logic level one of the stop bit 1503 in the sub-carrier off signal 1407 in the design of the receiver 212 in the base station 202. In the first preferred embodiment of the present invention, the receiver 212 is designed in such a manner that the first nine data bits having a logic level zero are sufficient for the receiver 212 to recognize that the sub-carrier off signal 1407 was sent by the transmitter 210 in the portable device 201. In other words, the receiver 212 simply doesn't even know that the tenth data bit has the wrong logic value. Alternatively, the receiver 212 may be designed with greater sensitivity such that the receiver 212 purposefully ignores a tenth data bit having a logic level one after first receiving the first nine data bits having a logic level zero. In other words, the receiver 212 knows that the tenth data bit has the wrong logic value, but since the receiver is knows about this anomaly, the receiver 212 makes the necessary allowances to properly identify such a string of data bits as representing the sub-carrier off signal 1407.

Note, in the sub-carrier on signal 1406 shown in FIG. 15, that the logic value of the stop bit 1503 has a proper value of logic one. Also note in both FIGS. 15 and 16 that the logic value of the start bit 1501 also has a proper value of logic zero.

5. IrDA Compliant Transceiver

Figure 17:
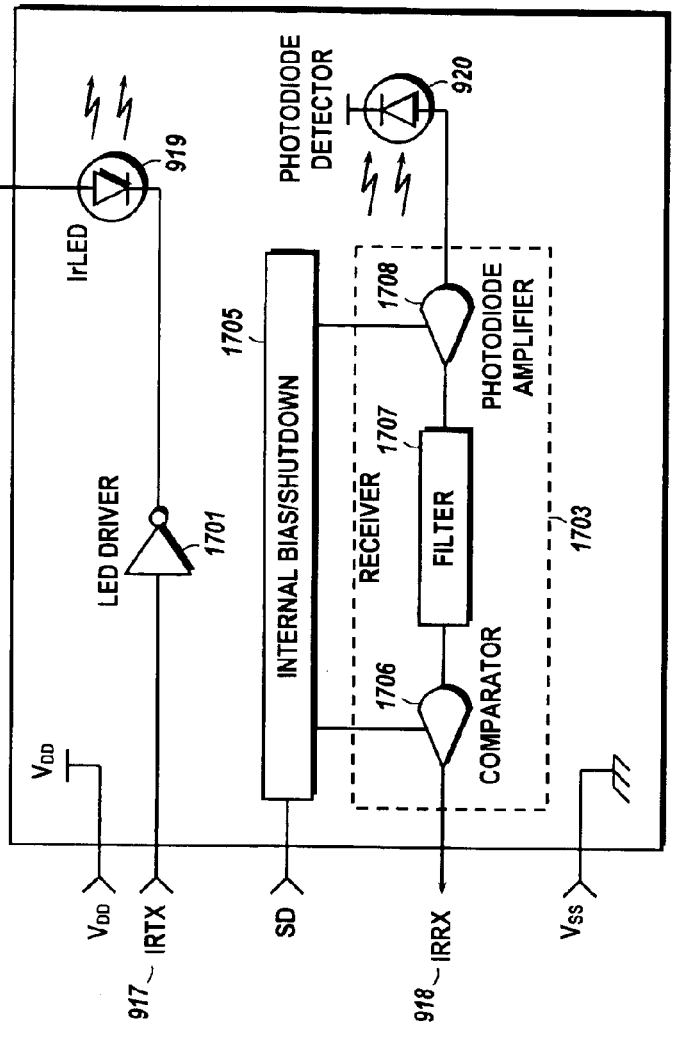
FIG. 17 illustrates a block diagram of an IrDA compliant transmitter and receiver (i.e., transceiver) in accordance with the prior art and used in the portable device, shown in FIG. 9, in accordance with a first preferred embodiment of the present invention.
Figure 18:
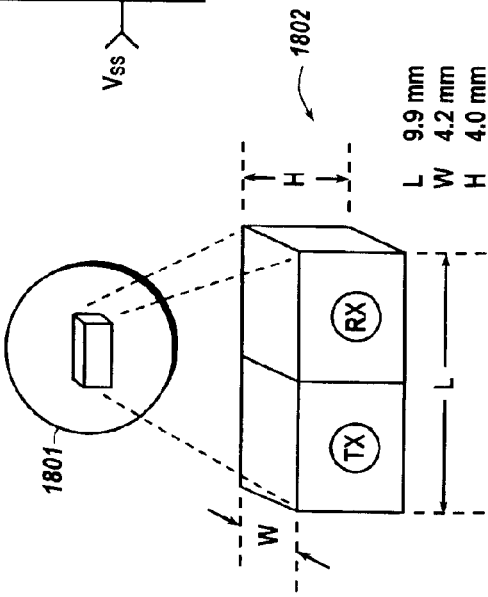
FIG. 18 illustrates a front, left and top side perspective view, in both an actual size and a magnified size, of the IrDA compliant transceiver, shown in FIG. 17, in accordance with the prior art and used in the portable device, shown in FIG. 9, in accordance with a first preferred embodiment of the present invention.

FIG. 17 illustrates a block diagram of an IrDA compliant transmitter and receiver (i.e., transceiver) 907 in accordance with the prior art and used in the portable device 201, shown in FIG. 9, in accordance with the first preferred embodiment of the present invention. FIG. 18 illustrates a front, left and top side perspective view, in both an actual size 1801 and a magnified size 1802, of the IrDA compliant transceiver 907, shown in FIG. 17, in accordance with the prior art and used in the portable device 201, shown in FIG. 9, in accordance with the first preferred embodiment of the present invention.

In the first preferred embodiment of the present invention, the IrDA compliant transceiver 907, shown in FIGS. 17 and 18, is manufactured by Novalog, inc., 151 Kalmus Drive K-1, Costa Mesa, Calif. 92626-5975, USA, www.novalog.com under part name: SIRComm™ "MiniSIR2™" 115.2 kbps IrDA 1.0 Miniature Transceiver Module. The term SIR refers to the phrase "serial infrared." Novalog claims that the MiniSIR2™ 115.2 kbps IrDA 1.0 compliant transceiver module is the world's smallest, most integrated, lowest power consumption IrDA 1.0 device in the industry. These features make the MiniSIR2 ideal for all handheld, battery operated, small form-factor devices where power and space are critical factors. The MiniSIR2 integrates an analog receiver 1703 with an on-chip LED power MOSFET driver transistor 1701, LED 919, photodiode 920, a filter 1707, a photodiode amplifier 1708, and a comparator 1706. The MiniSIR2 is compliant with the IrDA 1.0 specifications including a data rate range of 2400 bps to 115.2 kbps and a communication range of 0 meter to 1 meter (minimum). The MiniSIR2 is available in a miniature leadless surface mount technology (SMT) package, integrated with an electromagnetic interference (EMI) shield, having a length of 9.9 mm, a width of 4.2 mm and a height of 4.0 mm. Each of the emitting diode 919 and the receiving diode 920 have directional characteristic of about thirty degrees.

The SIRComm™ "MiniSIR2™", which meets the IrDA 1.0 standard, is a dual-voltage receiver that enables point-to-point wireless JR communications and data transfer between computers, peripherals and other electronic devices. The SIRComm™ "MiniSIR2™" transceiver modules are the smallest available IrDA-compliant transmitters/receivers, and require only a single, current limiting resistor (not shown) to set the power level of the emitting diode 919. MiniSIR2 has a special Power-Down (PD) feature and operates up to 115.2 kbps.

Novalog also manufactures an SlRComm "SIRtel" 115.2 kbps IrDA 1.2a compliant ultra-miniature transceiver module specifically designed to meet the unique needs, such as low transmit, supply and shutdown current, low supply voltage, extended operating temperature range and small size, of the mobile phone, pager and smart card markets. The ultra-small leadless SMT package, integrated with a EMI shield, has a length of 10.8 mm, a width of 3.3 mm and a height of 2.9 mm. The only external device required is a current limiting resistor to set the power level of the emitting diode. SIRtel is compliant with IrDA's new mobile communication (IrMC) standard 1.2a.

Novalog also manufactures an SIRFIR "SIR4" and "Mini-SIR4" 4 Mbps IrDA 1.1 compliant transceiver module providing even higher data rate transmission of 4 Mbps.

Other suppliers of IrDA compliant transceivers 907 from the following regions include: North America—Hewlett Packard, IBM, Novalog, SigmaTel, Texas Instruments, Agilent, Calibre/Zilog; Europe—Siemens and Vishay Telefunken (formerly Temic); Japan—Citizen, Matsushita, NEC, Rohm, Sanyo, Sharp, Stanley; and Asia/Pacific—Everlight and Lite-On.

The SIRComm "SIRtel", SIRFIR "SIR4" and "Mini-SIR4" generally have the same schematic diagram as shown in FIG. 17 and a similar relative actual size 1801 to that shown in FIG. 18. Any of the IrDA compliant transceivers manufactured by Novalog or by any other manufacturer may be used in combination with the ERIC technology. Advantages of the IrDA compliant transceiver in the ERIC technology include its miniature actual size, its low cost, its low power requirements, and its wide spread use.

I. Base Station

1. Block Diagram

Figure 19:
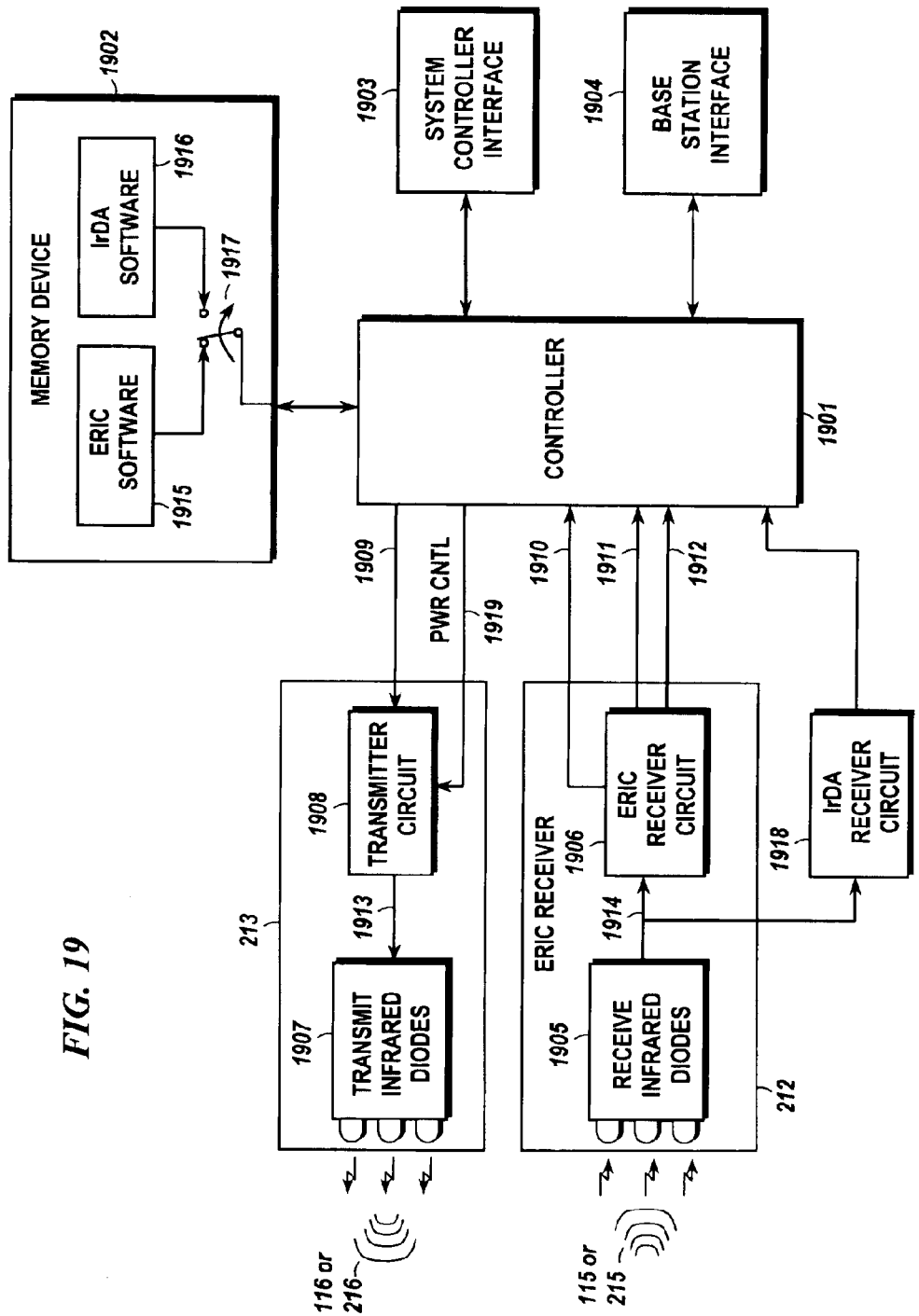
FIG. 19 illustrates a block diagram of the base station, shown in FIGS. 2 and 8, in accordance with a first preferred embodiment of the present invention.

FIG. 19 illustrates a block diagram of the base station 202, shown in FIGS. 2 and 8, in accordance with the first preferred embodiment of the present invention. The base station 202 generally includes a controller 1901, a memory device 1902 including ERIC software 1915, IrDA software 1916 and a software switch 1917, a system controller interface 1903, a base station interface 1904, an ERIC receiver 212 including receive infrared diodes 1905 and an ERIC receiver circuit 1906, an IrDA receiver circuit 1918 and a transmitter 213 including transmit infrared diodes 1907 and a transmitter circuit 1908.

The system controller interface 1903 interfaces signals between the controller 1901 and the system controller 203, shown in FIG. 2. The base station interface 1904 interfaces signals between the controller 1901 and other base stations 705, shown in FIG. 7. The controller selects between the ERIC software 1915 and the IrDA software 1916, via the switch 1917, to operate the base station 202 in either an ERIC communication mode or in an IrDA communication mode, as described in FIG. 24. Likewise, the controller 1901 internally selects to receive the signals 1910, 1911 and 1912 from the ERIC receiver circuit 1906 when the base station 202 operates in the ERIC communication mode and, alternatively, selects to receive a signal from the IrDA receiver circuit 1918 when the base station 202 operates in the IrDA communication mode. Further, the controller 1901 controls a power level of the transmitted signal 116 or 216 via the power control signal 1919 coupled to the transmitter circuit 1908. The controller 1901 sets the power level of the transmitter circuit 1908 to a relatively high power level when the base station 202 operates in the ERIC communication mode and, alternatively, sets the power level of the transmitter circuit 1908 to a relatively low power level when the base station 202 operates in the IrDA communication mode. Since the transmitted signal IrDA signal 116 and the transmitted ERIC signal 216 have the same IrDA signal modulation and the same IrDA data rate, only the power level needs to be changed to obtain an extended range 209 over the downlink channel 208.

The receive infrared diodes 1905, the ERIC receiver circuit 1906 and/or the IrDA receiver circuit 1918, and the controller 1901 may be distributed or integrated at any integration level depending on a particular environment having the base station 202. Likewise, the transmit infrared diodes 1907, the transmitter circuit 1908 and the controller 1901 may be distributed or integrated at any integration arrangement. For example, the transmit infrared diodes 1907 may reside in a first housing at a first location, the transmitter circuit 1908 may reside in a second housing at a second location and the controller 1901 may reside in a third housing at a third location to provide the most distributed arrangement. Further, the transmit infrared diodes 1907 may reside in a first housing at a first location, the transmitter circuit 1908 may reside in the first housing at a first location and the controller 1901 may reside in a second housing at a second location to provide an intermediate distribution arrangement. Further, the transmit infrared diodes 1907, the transmitter circuit 1908 and the controller 1901 may all reside in the same housing at the same location to provide the most integrated arrangement.

Therefore, the base station 202 is a key component to getting the portable device 201 connected to a network. The hardware in the receiver circuit 1906 and in the transmitter circuit 1908 are designed to contribute to the extended range 209 over the uplink channel 207 and over the downlink channel 208. However, as a whole, the base station 202 remains a relatively simple device because the ERIC signal modulation method, amplitude modulation (AM), is relatively simple and requires relatively inexpensive transmitter and receiver circuitry. An anticipated retail cost of the base station 202, as shown in FIG. 19, in high production volume may be less than 100.00 U.S. dollars per base station 202. Further, the anticipated size of the base station 202, as shown in FIG. 19, is expected to be 1000 cm$^3$ (one thousand cubic centimeters) to 8000 cm$^3$ (eight thousand cubic centimeters), or even less than 1000 cm$^3$, depending on the particular application and commercial market.

2. Receiver

Figure 20:
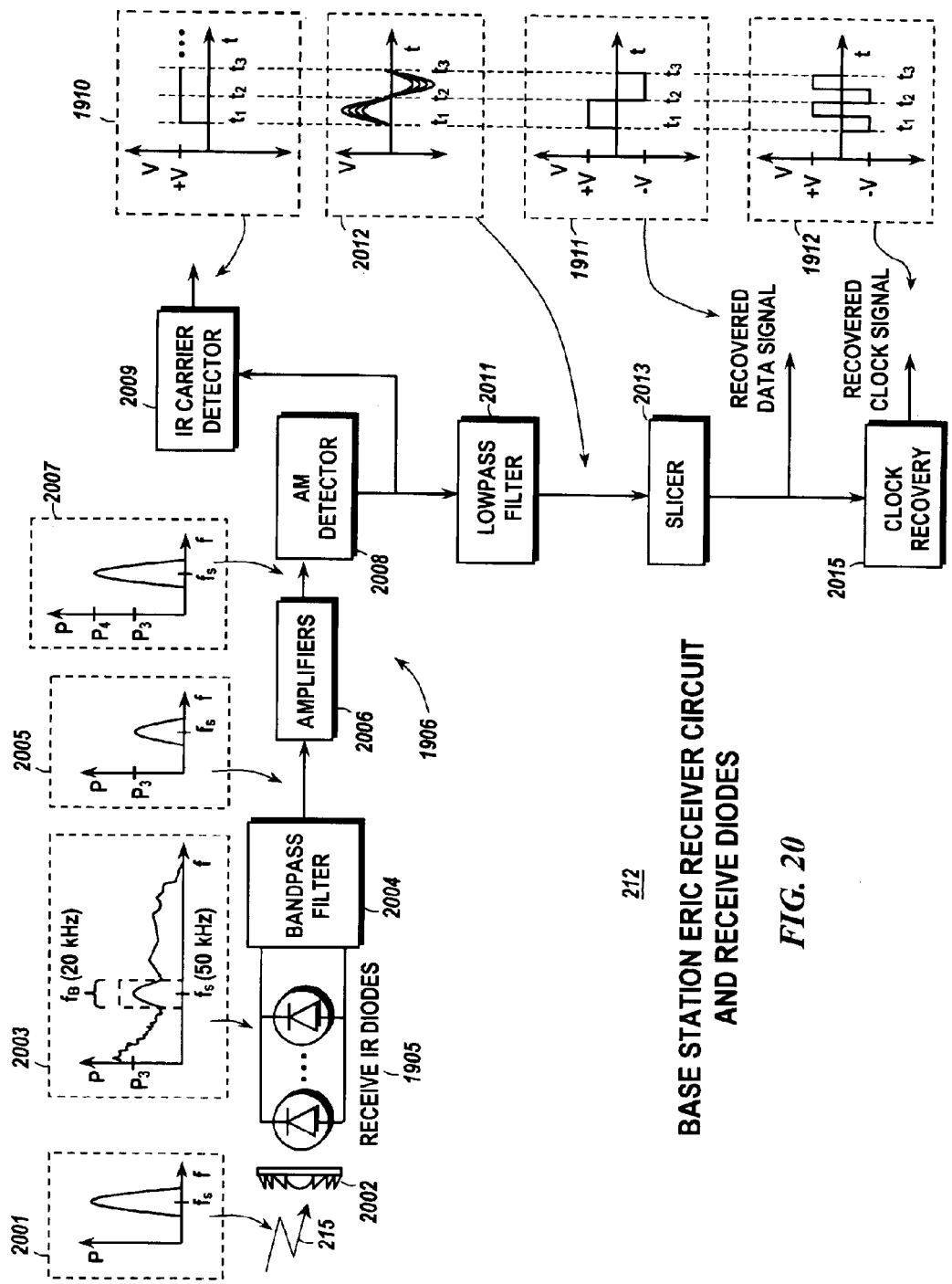
FIG. 20 illustrates a block diagram of a receiver used in the base station, shown in FIG. 19, in accordance with a first preferred embodiment of the present invention.

FIG. 20 illustrates a block diagram of a receiver 212 used in the base station 202, shown in FIG. 19, in accordance with the first preferred embodiment of the present invention. The receiver 212 generally includes a fresnel lens 2002, receive infrared diodes 1905, a bandpass filter 2004, amplifiers 2006, an amplitude modulation (AM) detector 2008, an infrared carrier detector 2009, a lowpass filter 2011, a slicer 2013 and a clock recovery circuit 2015. Each of the elements and blocks in the receiver 212 in FIG. 20 are individually well known in the art.

The receiver 212 receives an infrared signal 215 represented in the frequency spectrum 2001. Note in the frequency spectrum 2001 that the preferred frequency of the sub-carrier signal is 50 KHz and has a high power level as represented at the transmitter 210 that transmitted the signal 215. The lens 2002 receives the signal 215 magnifies and focuses the infrared signal 215 to improve the sensitivity of the receiver 212 to receive weak signals. Hence, the lens 2002 also contributes to increase the ERIC range 209.

The receive infrared diodes 1905 detect the infrared signal 215, represented in the frequency spectrum 2003, and converts the signal 215 from an infrared signal to an electrical signal. Note in the frequency spectrum 2003 that the receive signal is surrounded by noise from the communication channel and that the bandpass filter has a bandwidth of 20 KHz.

The bandpass filter 2004 filters the signal 215 over the bandwidth of 20 KHz to remove the noise to produce a bandpass filtered signal, as represented in the frequency spectrum 2005. The amplifiers 2006 increase the gain of the filtered signal 215 to produce an amplified signal, as represented in the frequency spectrum 2007. The AM detector 2008 detects the amplitude of the amplified signal. The infrared carrier detector 2009 detects the presence of the infrared carrier signal carrying the amplified signal, as represented in the timing diagram 1910. The lowpass filter 2011 filters the AM detected signal to produce a lowpass filtered signal, as represented in the timing diagram 2012. The slicer 2013 slices the lowpass filtered signal to produce a recovered data signal, as represented in the timing diagram 1911. The clock recovery circuit 2015 recovers the clock signal from the recovered data signal to produce the recovered clock signal, as represented in the timing diagram 1912.

Figure 21:
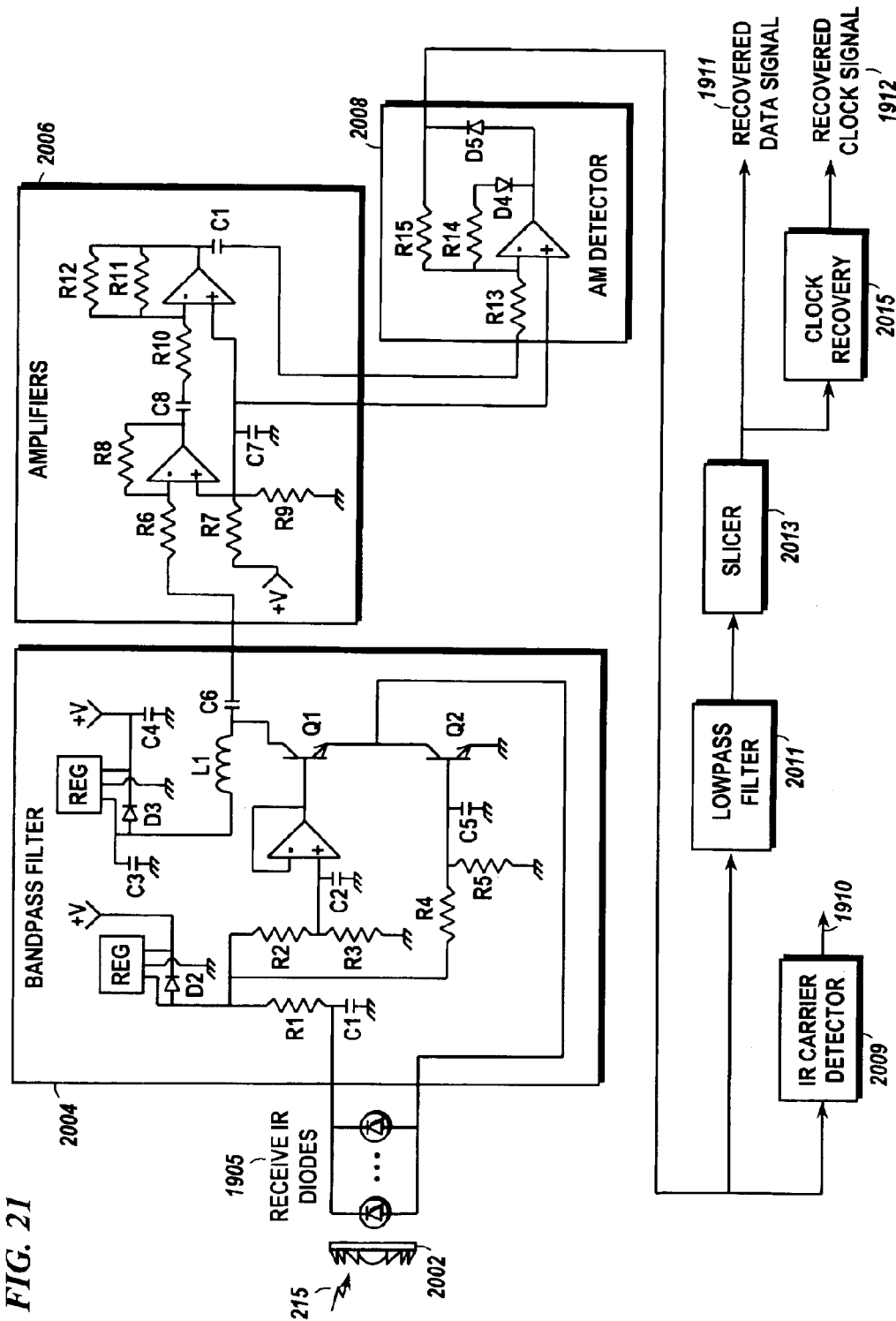
FIG. 21 illustrates a schematic diagram of the receiver, shown in FIG. 20, in accordance with a first preferred embodiment of the present invention.

FIG. 21 illustrates a schematic diagram of the receiver 212, shown in FIG. 20, in accordance with the first preferred embodiment of the present invention. FIG. 21 is the same as FIG. 20, except that FIG. 21 provides a detailed schematic of the bandpass filter 2004, the amplifiers 2006 and the AM detector 2008. The detailed schematic of the bandpass filter 2004, the amplifiers 2006 and the AM detector 2008 are individually well known in the art.

3. Transceiver

Figure 22:
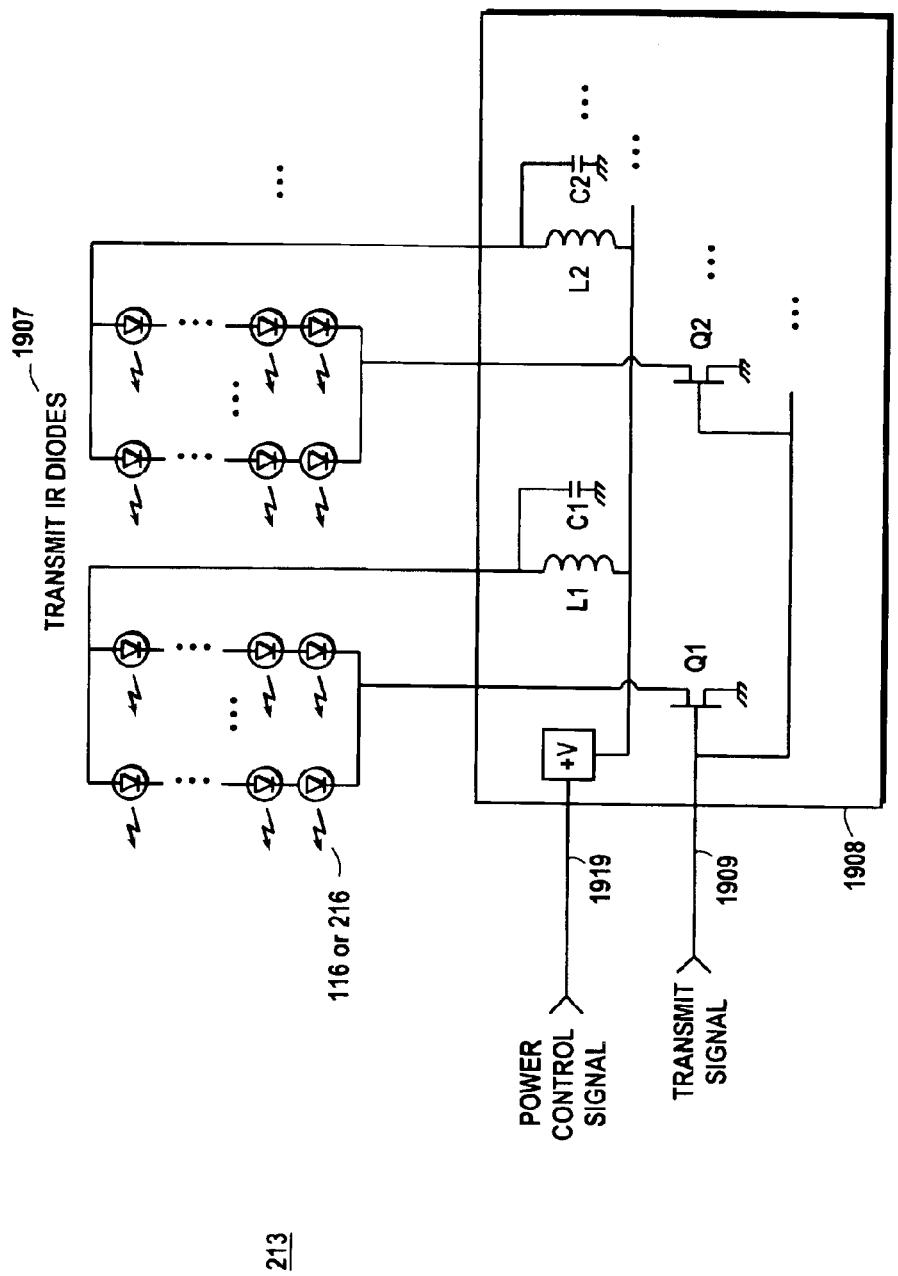
FIG. 22 illustrates a schematic diagram of a transmitter used in the base station, shown in FIG. 19, in accordance with a first preferred embodiment of the present invention.

FIG. 22 illustrates a schematic diagram of a transmitter 213 used in the base station 202, shown in FIG. 19, in accordance with the first preferred embodiment of the present invention. Generally, the transmitter 213 includes trans infrared diodes 1907 and a transmitter circuit 1908. The transmitter circuit 1908 generally includes driver transistors and other related circuitry to drive power to the transmit infrared diodes 1907. The transmitter circuit 1908 is generally well known in the art. The transmit infrared diodes 1907 are arranged in a series/parallel arrangement to optimize the infrared light emitted from each diode while respecting the power consumption limits on each diode, as is well known in the art.

The transmitter 213 provides the relatively high power for the ERIC transmit signal 216 on the downlink channel 208 or the relatively low power for the IrDA transmit signal 116 on the downlink channel 208. The controller 1901 controls the transmitter circuit 1908 via the power control signal 1919. In the first preferred embodiment of the present invention, the power control signal 1919 varies the power level of the transmit signal 116 or 216 by varying the voltage supply (V+) to the transmit IR diodes 1907. Alternatively, other ways to vary the power level of the transmit signal 116 or 216 may be used, as recognized by those skilled in the art.

4. Physical Layout

Figure 23:
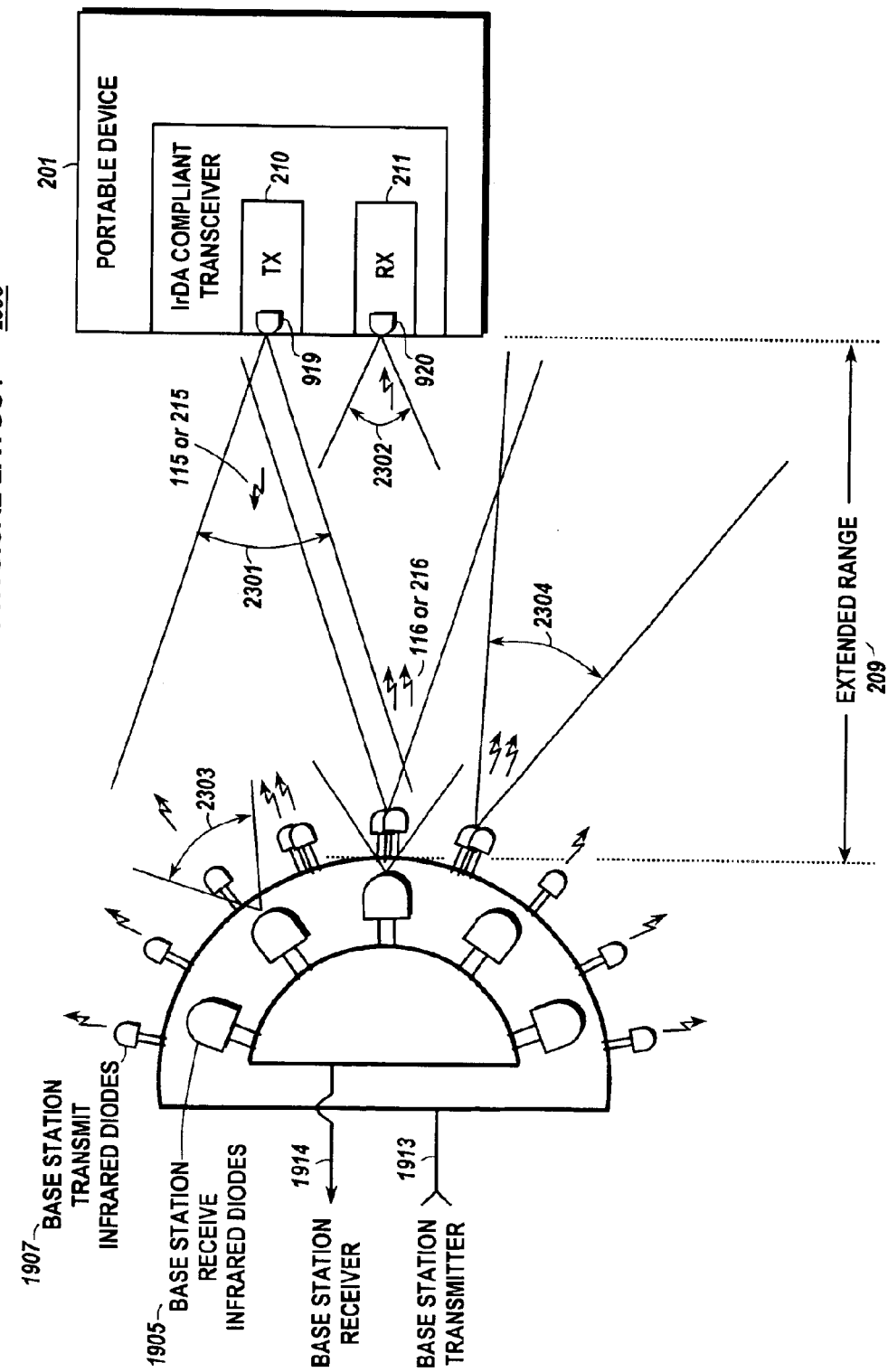
FIG. 23 illustrates a top view of a physical layout of the base station, shown in FIGS. 2, 8 and 19, including transmit infrared diodes and their associated coverage areas and ranges and receive infrared diodes and their associated coverage areas and ranges, and the portable unit, shown in FIGS. 2, 7 and 9, including the IrDA compliant transceiver, shown in FIGS. 12 and 13, having a transmit infrared diode and its associated coverage area and range and a receive infrared diode and its associated coverage area and range, in accordance with a first preferred embodiment of the present invention.

FIG. 23 illustrates a top view of a physical layout of the base station 202, shown in FIGS. 2, 7 and 19, including infrared transmit diodes 1907 and their associated coverage areas and ranges and infrared receive diodes 1905 and their associated coverage areas and ranges, and the portable unit 201, shown in FIGS. 2, 7 and 9, including the IrDA compliant transceiver, shown in FIGS. 12 and 13, having the infrared transmit diode 919 and its associated coverage area and range and the infrared receive diode 920 and its associated coverage area and range, in accordance with the first preferred embodiment of the present invention.

Referring first to the uplink channel 207, the infrared transmit diode 919 in the portable device 201 transmits an infrared signal 115 or 215, depending on whether the portable device 201 is operating in the ERIC communication mode or the IrDA communication mode. The infrared transmit diode 919 typically have an angle of emission 2301 of thirty degrees. Hence, the farther the infrared signal 115 or 215 travels from the portable device 201, the wider the coverage area. As described in the present specification, the ERIC technology is employed in the portable device 201 to create the extended range 209 over the uplink channel between the portable device 201 and the base station 202. However, the farther the infrared signal 115 or 215 travels from the portable device 201, the weaker the signal strength of the infrared signal 115 or 215.

The infrared receive diodes 1905 in the base station 202 receive the infrared signal 115 or 215 transmitted by the portable device 201. The infrared receive diodes 1905 typically have an angle of detection 2303 of forty-five degrees and have a high degree of detector sensitivity. As described in the present specification, the ERIC technology is employed in the receiver 212 of the base station 202 to create the extended range 209 over the uplink channel between the portable device 201 and the base station 202.

Referring next to the downlink channel, the infrared transmit diodes 1907 in the base station 202 transmit an infrared signal 116 or 216. The infrared transmit diodes 1907 typically have an angle of emission 2304 of thirty degrees. Hence, the farther the infrared signal 116 or 216 travels from the base station 202, the wider the coverage area. In the first preferred embodiment of the present invention, the infrared transmit diodes 1907 are placed close next to each other at the center of the IR transmitter diode layout. This type of diode placement advantageously increases the transmission range of the infrared signal 116 or 216 transmitted by infrared transmit diodes 1907 at the center of the IR transmitter diode layout. As described in the present specification, the ERIC technology is employed in the base station 202 to create the extended range 209 over the downlink channel between the portable device 201 and the base station 202.

The infrared receive diode 920 in the portable device 201 receives the infrared signal 116 or 216 transmitted by the base station 202. The infrared receive diode 920 typically have an angle of detection 2302 of thirty degrees. As described in the present specification, the IrDA technology is employed in the receiver 211 of the portable device 201 to receive the IrDA compatible high power signal 116 or 216 over the downlink channel between the portable device 201 and the base station 202.

5. Flowchart

Figure 24:
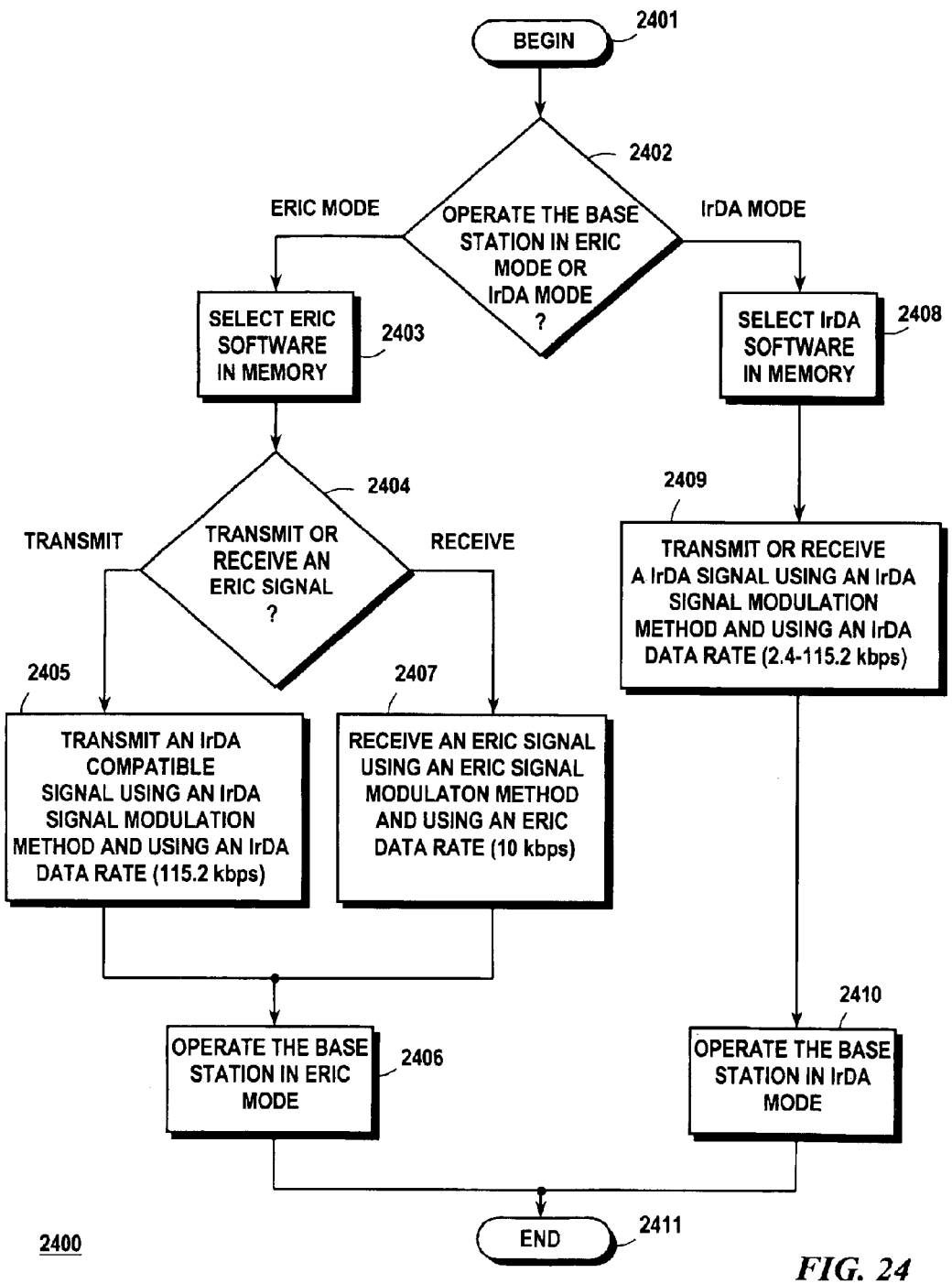
FIG. 24 illustrates a flowchart describing steps of a method of operation performed by the base station, shown in FIGS. 2, 8 and 19, in accordance with a first preferred embodiment of the present invention.

FIG. 24 illustrates a flowchart 2400 describing steps of a method of operation performed by the base station 202, shown in FIGS. 2, 8 and 19, in accordance with the first preferred embodiment of the present invention.

At step 2401, the flowchart 2400 begins.

At step 2402, the base station 202 makes a determination whether to operate the base station 202 in the ERIC communication mode or the IrDA communication mode. The determination may be made manually generated by the user, such as via a software or hardware switch (each not shown), or may be made generated automatically, such as when application software 910 is used or launched by the portable device 201.

At step 2403, the base station 202 selects the ERIC software 1915 in the memory device 1902, via the software switch 1917, responsive to the base station 202 making the determination to operate in the ERIC communication mode at step 2402. Practically, the controller 1901 makes the selection by sending a command over a communication bus to the memory device 1902 to enable the ERIC software routine.

At step 2404, the base station 202 makes a determination whether to transmit an ERIC signal 216 or receive an ERIC signal 215 in the ERIC communication mode responsive to the base station 202 selecting the ERIC software 1915 in the memory device 1902 at step 2403. In the first preferred embodiment of the present invention, this determination is made because the portable device 201 operates in a simplex mode and does not transmit and receive signals at the same time. Therefore, the base station 202 mirrors the simplex mode of the portable device 201 by not transmitting and receiving signals at the same time.

At step 2405, the base station 202 transmits the ERIC signal 216 using an IrDA signal modulation method (e.g. pulse modulation) and using an IrDA data rate (e.g., 115.2 kbps) responsive to the base station 202 making the determination to transmit the ERIC signal 216 in the ERIC communication mode at step 2404. FIG. 22 describes further details of how the base station 202 transmits the ERIC signal 216.

At step 2406, the base station 202 operates in the ERIC communication mode responsive to the base station 202 transmitting the ERIC signal 216 or receiving the ERIC signal 215 at steps 2405 and 2407, respectively. In the ERIC communication mode, the base station 202 enables the portable device 201 to use any application described herein under the detailed description, section J, in any commercial market setting described herein under the detailed description, section K.

At step 2407, the base station 202 receives the ERIC signal 215, having an ERIC signal modulation method (e.g. amplitude modulation) and having an ERIC data rate (e.g., 10 kbps), responsive to the base station 202 making the determination to receive the ERIC signal 215 in the ERIC communication mode at step 2404. FIGS. 20 and 21 describe further details of how the portable device 201 receives the ERIC signal 215.

At step 2408, the base station 202 selects the IrDA software 1916 in the memory device 1902, via the software switch 1917 responsive to the base station 202 making the determination to operate in the IrDA communication mode at step 2402. Practically, the controller 1901 makes the selection by sending a command over a communication bus to the memory device 1902 to enable the IrDA software routine.

At step 2409, the base station 202 transmits an IrDA signal 116 or receives an IrDA signal 115 using an IrDA signal modulation method (e.g. pulse modulation) and using an IrDA data rate (e.g., 115.2 kbps) responsive to the base station 202 selecting the IrDA software 1916 in the memory device 1902 at step 2408. Since the signal modulation method and the data rate is the same for each of the IrDA transmit signal 116 and the IrDA receive signal 115, there is no need to periodically reconfigure the software or the hardware in the base station 202 when the base station 202 transmits the IrDA transmit signal 116 or receives the IrDA receive signal 115.

At step 2410, the base station 202 operates in the IrDA communication mode responsive to the base station 202 transmitting the IrDA signal 116 or receiving the IrDA signal 115 at step 2409. In the IrDA communication mode, the base station 202 permits the portable device 201 to use any conventional IrDA application in any conventional IrDA setting, as is well known in the art.

At step 2411, the flowchart 2400 ends.

J. Applications

Applications for the ERIC technology include, without limitation, network access, including internet access, intranet access, and the like; communication, including email, local messaging or chatting, wireless posted notes, paging, and the like; file access, including records such as that for medical, employment, and the like; file transfer, including MP3 files, photos, documents, video, report disseminator, and the like; file synchronization, such as between a portable device and personal computer (PC), server platforms, and the like; location based services, such as for shopping, restaurants, and the like; remote control and the like; electronic services, including registration, ordering, billing, payment and receipt, and the like; electronic commerce, including customer to customer, customer to business, business to business, and the like; electronic entry, including ticket, key and the like; information post or kiosk, including that having a broadcast channel and the like; advertisement and the like, and games and the like. Therefore, the ERIC technology takes advantage of many presently existing electronic applications.

K. Commercial Markets

Commercial markets that can use the ERIC technology include, without limitation, hotels, including rooms, lobbies, conference rooms, area grounds, and the like; restaurants, including sit down and fast food such as drive thru and inside, and the like; transportation, including trains, planes, buses, cars, boats, taxies, and the like; shopping centers, including food (supermarkets), clothing (malls), storefronts, and the like; private offices, including offices for doctors, dentists, lawyers, businesses, companies, and the like; buildings including libraries, government buildings, hospitals, airports, museums, parking garages, and the like; open areas, including gas stations, parks, parking lots, and the like; entertainment establishments, including movie theaters, play theaters, theme parks, historical sites, and the like; sports arenas, including baseball, football, basketball, soccer, track, golf course, ice skating, swimming, and the like. Therefore, the ERIC technology advantageously may be deployed in a very wide variety of commercial markets.

Hence, while the present invention has been described with reference to various illustrative embodiments thereof, the present invention is not intended that the invention be limited to these specific embodiments. Any of the ideas disclosed herein may be independently combined in any way to create a multitude of combination of ideas from various perspectives based on the same present disclosure. For example, the asymmetrical data rates may be employed in a portable device having the ERIC mode but not the IrDA mode. Further, for example, the different signal modulation methods may be employed in a portable device having the ERIC mode but not the IrDA mode. Those skilled in the art will recognize that variations, modifications and combinations of the disclosed subject matter can be made without departing from the spirit and scope of the invention as set forth in the appended claims.

What is claimed is:

1. A portable device comprising:
   a first communication mode adapted to permit the portable device to transmit and to receive an infrared data association (IrDA) signal over a first communication range;
   a second communication mode adapted to permit the portable device to transmit and to receive an extended range infrared communication (ERIC) signal over a second communication range that is greater than the first communication range; and
   a data rate generator adapted to cause the portable device to:
      transmit and to receive the IrDA signal at an IrDA data rate selected from a plurality of IrDA data rates when the portable device is operating in the first communication mode,
      transmit the ERIC signal at a first ERIC data rate when the portable device is operating in the second communication mode, and
      receive the ERIC signal at a second ERIC data rate when the portable device is operating in the second communication mode.

2. A portable device according to claim 1 wherein the first ERIC data rate is lower than the second ERIC data rate.

3. A portable device according to claim 1 wherein the second ERIC data rate is equal to a maximum IrDA data rate.

4. A portable device according to claim 1 further comprising:
   a signal modulator/demodulator (modem) including:
      an IrDA signal modulator adapted to transmit the IrDA signal using an IrDA signal modulation method when the portable device is operating in the first communication mode;
      an IrDA signal demodulator adapted to receive the IrDA signal using an IrDA signal demodulation method when the portable device is operating in the first communication mode and adapted to receive the ERIC signal using the IrDA signal demodulation method when the portable device is operating in the second communication mode; and
      an ERIC signal modulator adapted to transmit the ERIC signal using an ERIC signal modulation method when the portable device is operating in the second communication mode.

5. A portable device according to claim 4 wherein the ERIC signal modulation method further comprises:
   amplitude modulation (AM).

6. A portable device according to claim 5 wherein the amplitude modulation (AM) further comprises:
   a main carrier signal representing the ERIC signal at an infrared frequency; and
   a sub-carrier signal, modulated onto the main carrier signal, representing the ERIC signal at the first ERIC data rate.

7. A portable device according to claim 4 wherein the signal modem further comprises:
   an IrDA compliant signal encoder/decoder (ENDEC) including:
      a signal encoder adapted to encode the IrDA signal, using the IrDA signal modulation method, to generate an encoded IrDA signal when the portable device is transmitting the IrDA signal in the first communication mode;
      a signal bypass path coupled to an input terminal and an output terminal of the signal encoder and adapted to route the ERIC signal, having the ERIC signal modulation method, around the signal encoder when the portable device is transmitting the ERIC signal in the second communication mode; and
      a signal decoder adapted to decode the IrDA signal, using the IrDA signal demodulation method, to generate an decoded IrDA signal when the portable device is receiving the IrDA signal in the first communication mode, and adapted to decode the ERIC signal, using the IrDA signal demodulation method, to generate a decoded ERIC signal when the portable device is operating in the second communication mode.

8. A portable device comprising:

a first communication mode adapted to permit the portable device to transmit and to receive an infrared data association (IrDA) signal over a first communication range;

a second communication mode adapted to permit the portable device to transmit and to receive an extended range infrared communication (ERIC) signal over a second communication range that is greater than the first communication range;

a signal modulator/demodulator (modem) including:
an IrDA signal modulator adapted to transmit the IrDA signal using an IrDA signal modulation method when the portable device is operating in the first communication mode;
an IrDA signal demodulator adapted to receive the IrDA signal using an IrDA signat demodulation method when the portable device is operating in the first communication mode and adapted to receive the ERIC signal using the IrDA signal demodulation method when the portable device is operating in the second communication mode;
an ERIC signal modulator adapted to transmit the ERIC signal using an ERIC signal modulation method when the portable device is operating in the second communication mode; and
an IrDA compliant signal encoder/decoder (ENDEC) including:
a signal encoder adapted to encode the IrDA signal, using the IrDA signal modulation method, to generate an encoded IrDA signal when the portable device is transmitting the IrDA signal in the first communication mode;
a signal bypass path coupled to an input terminal and an output terminal of the signal encoder and adapted to route the ERIC signal, having the ERIC signal modulation method, around the signal encoder when the portable device is transmitting the ERIC signal in the second communication mode; and
a signal decoder adapted to decode the IrDA signal, using the IrDA signal demodulation method, to generate a decoded IrDA signal when the portable device is receiving the IrDA signal in the first communication mode, and adapted to decode the ERIC signal, using the IrDA signal demodulation method, to generate a decoded ERIC signal when the portable device is operating in the second communication mode.

9. A portable device comprising:

a memory device including:
a first software routine adapted to cause the portable device to operate in a first communication mode permitting the portable device to transmit and to receive an infrared data association (IrDA) signal over a first communication range;
a second software routine adapted to cause the portable device to operate in a second communication mode permitting the portable device to transmit and to receive an extended range infrared communication (ERIC) signal over a second communication range that is greater than the first communication range;

an IrDA compliant transceiver including:
a transmitter adapted to transmit the IrDA signal over the first communication range when the portable device is operating in the first communication mode and adapted to transmit the ERIC signal over the second communication range when the portable device is operating in the second communication mode; and
a receiver adapted to receive the IrDA signal over the first communication range when the portable device is operating in the first communication mode and adapted to receive the ERIC signal over the second communication range when the portable device is operating in the second communication mode; and a data rate generator adapted to cause the portable device to:
transmit and to receive the IrDA signal at an IrDA data rate selected from a plurality of IrDA data rates when the portable device is operating in the first communication mode,
transmit the ERIC signal at a first ERIC data rate when the portable device is operating in the second communication mode, and
receive the ERIC signal at a second ERIC data rate when the portable device is operating in the second communication mode.

10. A portable device according to claim 9 wherein the first ERIC data rate is lower than the second ERIC data rate.

11. A portable device according to claim 9 wherein the second ERIC data rate is equal to a maximum IrDA data rate.

12. A portable device according to claim 9 further comprising:

a signal modulator/demodulator (modem) including:
an IrDA signal modulator adapted to transmit the IrDA signal using an IrDA signal modulation method when the portable device is operating in the first communication mode,
an IrDA signal demodulator adapted to receive the IrDA signal using an IrDA signal demodulation method when the portable device is operating in the first communication mode and adapted to receive the ERIC signal using the IrDA signal demodulation method when the portable device is operating in the second communication mode; and
an ERIC signal modulator adapted to transmit the ERIC signal using an ERIC signal modulation method when the portable device is operating in the second communication mode.

13. A portable device according to claim 12 wherein the ERIC signal modulation method further comprises:

amplitude modulation (AM).

14. A portable device according to claim 13 wherein the amplitude modulation (AM) further comprises:

a main carrier signal representing the ERIC signal at an infrared frequency; and
a sub-carrier signal, modulated onto the main carrier signal, representing the ERIC signal at the first ERIC data rate.

15. A portable device according to claim 12 wherein the signal modem further comprises:

an IrDA compliant signal encoder/decoder (ENDEC) including:
a signal encoder adapted to encode the IrDA signal, using the IrDA signal modulation method, to generate an encoded IrDA signal when the portable device is transmitting the IrDA signal in the first communication mode;

a signal bypass path coupled to an input terminal and an output terminal of the signal encoder and adapted to route the ERIC signal, having the ERIC signal modulation method, around the signal encoder when the portable device is transmitting the ERIC signal in the second communication mode; and a signal decoder adapted to decode the IrDA signal, using the IrDA signal demodulation method, to generate an decoded IrDA signal when the portable device is receiving the IrDA signal in the first communication mode, and adapted to decode the ERIC signal, using the IrDA signal demodulation method, to generate a decoded ERIC sign al when the portable device is operating in the second communication mode.

16. A portable device comprising:

a memory device including:
  a first software routine adapted to cause the portable device to operate in a first communication mode permitting the portable device to transmit and to receive an infrared data association (IrDA) signal over a first communication range; and
  a second software routine adapted to cause the portable device to operate in a second communication mode permitting the portable device to transmit and to receive an extended range infrared communication (ERIC) signal over a second communication range that is greater than the first communication range:

an IrDA compliant transceiver including;
  a transmitter adapted to transmit the IrDA signal over the first communication range when the portable device is operating in the first communication mode and adapted to transmit the ERIC signal over the second communication range when the portable device is operating in the second communication mode; and
  a receiver adapted to receive the IrDA signal over the first communication range when the portable device is operating in the first communication mode and adapted to receive the ERIC signal over the second communication range when the portable device is operating in the second communication mode;

a signal modulator/demodulator (modem) including:
  an IrDA signal modulator adapted to transmit the IrDA signal using an IrDA signal modulation method when the portable device is operating in the first communication mode;
  an IrDA signal demodulator adapted to receive the IrDA signal using an IrDA signal demodulation method when the portable device is operating in the first communication mode and adapted to receive the ERIC signal using the IrDA signal demodulation method when the portable device is operating in the second communication mode; and
  an ERIC signal modulator adapted to transmit the ERIC signal using an ERIC signal modulation method when the portable device is operating in the second communication mode; and an IrDA compliant signal encoder/decoder (ENDEC) including:
  a signal encoder adapted to encode the IrDA signal, using the IrDA signal modulation method, to generate an encoded IRDA signal when the portable device is transmitting the IrDA signal in the first communication mode;
  a signal bypass path coupled to an input terminal and an output terminal of the signal encoder and adapted to route the ERIC signal, having the ERIC signal modulation method, around the signal encoder when the portable device is transmitting the ERIC signal in the second communication mode; and
  a signal decoder adapted to decode the IrDA signal, using the IrDA signal demodulation method, to generate an decoded IrDA signal when the portable device is receiving the IrDA signal in the first communication mode, and adapted to decode the ERIC signal, using the IrDA signal demodulation method, to generate a decoded ERIC signal when the portable device is operating in the second communication mode.

17. A portable device comprising:

a memory device including:
  a first software routine adapted to cause the portable device to operate in a first communication mode permitting the portable device to transmit and to receive an infrared data association (IrDA) signal over a first communication range; and
  a second software routine adapted to cause the portable device to operate in a second communication mode permitting the portable device to transmit and to receive an extended range infrared communication (ERIC) signal over a second communication range that is greater than the first communication range;

an IrDA compliant transceiver including:
  a transmitter adapted to transmit the IrDA signal over the first communication range when the portable device is operating in the first communication mode and adapted to transmit the ERIC signal over the second communication range when the portable device is operating in the second communication mode, wherein the transmitter further comprises:
    a near infrared emitter diode adapted to convert a transmit signal from an electrical signal into an infrared signal that is representative of the electrical signal, wherein the transmit signal represents the IrDA signal when the portable device is operating in the first communication mode, and wherein the transmit signal represents the ERIC signal when the portable device is operating in the second communication mode; and
  a receiver adapted to receive the IrDA signal over the first communication range when the portable device is operating in the first communication mode and adapted to receive the ERIC signal over the second communication range when the portable device is operating in the second communication mode, wherein the receiver further comprises:
    a near infrared detector diode adapted to convert a receive signal from an infrared signal into an electrical signal that is representative of the infrared signal, wherein the receive signal represents the IrDA signal when the portable device is operating in the first communication mode, and wherein the receive signal represents the ERIC signal when the portable device is operating in the second communication mode;

a data rate generator adapted to cause the portable device to:
  transmit and to receive the IrDA signal at an IrDA data rate selected from a plurality of IrDA data rates when the portable device is operating in the first communication mode,
  transmit the ERIC signal at a first ERIC data rate when the portable device is operating in the second communication mode, and receive the ERIC signal at a second ERIC data rate, greater than the first ERIC data rate, when the portable device is operating in the second communication mode;

a signal modulator/demodulator (modem) including:
an IrDA signal modulator adapted to transmit the IrDA signal using an IrDA signal modulation method when the portable device is operating in the first communication mode;
an IrDA signal demodulator adapted to receive the IrDA signal using an IrDA signal demodulation method when the portable device is operating in the first communication mode and adapted to receive the ERIC signal using the IrDA signal demodulation method when the portable device is operating in the second communication mode; and
an ERIC signal modulator adapted to transmit the ERIC signal using an ERIC signal modulation method when the portable device is operating in the second communication mode, wherein the ERIC signal modulation method further comprises amplitude modulation (AM), and wherein the amplitude modulation (AM) further comprises:
a main carrier signal representing the ERIC signal at an infrared frequency; and
a sub-carrier signal, modulated onto the main carrier signal, representing the ERIC signal at the first ERIC data rate, wherein the signal modem further comprises:
an IrDA compliant signal encoder/decoder (ENDEC) including:
a signal encoder adapted to encode the IrDA signal, using the IrDA signal modulation method, to generate an encoded IrDA signal when the portable device is transmitting the IrDA signal in the first communication mode;
a signal bypass path coupled to an input terminal and an output terminal of the signal encoder and adapted to route the ERIC signal, having the ERIC signal modulation method, around the signal encoder when the portable device is transmitting the ERIC signal in the second communication mode; and a signal decoder adapted to decode the IrDA signal, using the IrDA signal demodulation method, to generate a decoded IrDA signal when the portable device is receiving the IrDA signal in the first communication mode, and adapted to decode the ERIC signal, using the IrDA signal demodulation method, to generate a decoded ERIC signal when the portable device is operating in the second communication mode;

a signal converter including:
a parallel to serial signal converter coupled to receive the transmit signal, representing the IrDA signal or the ERIC signal, and adapted to convert the transmit signal from a parallel data format to a serial data format; and
a serial to parallel signal converter coupled to receive the receive signal, representing the IrDA signal or the ERIC signal, and adapted to convert the receive signal from a serial data format to a parallel data format;

a controller adapted to control a selection of one of the first communication mode and the second communication mode responsive to a communication mode control signal;

an input device adapted to generate an input signal for controlling the portable device when the portable device is operating in the first communication mode or the second communication mode; and an output device adapted to generate an output signal responsive to receiving the IrDA signal when the portable device is operating in the first communication mode and responsive to receiving the ERIC signal when the portable device is operating in the second communication mode.

18. A portable device according to claim 17 wherein the data rate generator, the signal modulator/demodulator (modem) that comprises the IrDA compliant signal encoder/decoder (ENDEC), the signal converter, are integrated together within a universal asynchronous receiver transmitter (UART).

* * * * *